(12) United States Patent
Humbertjean et al.

(10) Patent No.: US 12,076,723 B2
(45) Date of Patent: Sep. 3, 2024

(54) GLASS CONTAINER COMPRISING A GLASS BOTTOM WITH IMPROVED PROPERTIES

(71) Applicants: SCHOTT PHARMA AG & CO. KGAA, Mainz (DE); SCHOTT PHARMA SCHWEIZ AG, St. Gallen (CH)

(72) Inventors: Alexander Humbertjean, Bad Krozingen (DE); Tobias Wetzel, Sölden (DE); Robert Frost, Grub AR (CH); Jens Ulrich Thomas, Mainz (DE); Frank-Thomas Lentes, Bingen (DE); Andreas Langsdorf, Ingelheim (DE); Doris Moseler, Budenheim (DE); Günter Weidmann, Flonheim (DE); Roman Huhn, St. Gallen (CH)

(73) Assignee: SCHOTT AG, Mainz (DE)

(*) Notice: Subject to any disclaimer, the term of this patent is extended or adjusted under 35 U.S.C. 154(b) by 419 days.

(21) Appl. No.: 17/126,618

(22) Filed: Dec. 18, 2020

(65) Prior Publication Data
US 2021/0187497 A1 Jun. 24, 2021

(30) Foreign Application Priority Data

Dec. 20, 2019 (EP) .................... 19219010

(51) Int. Cl.
*B65D 1/02* (2006.01)
*A61J 1/14* (2023.01)
(Continued)

(52) U.S. Cl.
CPC ............ *B01L 3/508* (2013.01); *A61J 1/1468* (2015.05); *B65D 1/0261* (2013.01); *B65D 81/30* (2013.01);
(Continued)

(58) Field of Classification Search
CPC ....... B65D 1/0261; B65D 1/02; B01L 220/12; B01L 2300/0835; B01L 2300/0832; B01L 2300/0851; A61J 1/065; A61J 1/05
(Continued)

(56) References Cited

U.S. PATENT DOCUMENTS 2,282,993 A 5/1942 Dichter
2,835,079 A 5/1958 Camarata
(Continued)

FOREIGN PATENT DOCUMENTS

CN 105271655 1/2016
CN 105377779 3/2016
(Continued)

OTHER PUBLICATIONS

ISO 12775, 1st edition Oct. 15, 1997, 14 pages.
(Continued)

*Primary Examiner* — Ernesto A Grano
(74) *Attorney, Agent, or Firm* — Ruggiero McAllister & McMahon LLC

(57) ABSTRACT

A glass container is provided that includes a tube, a circular bottom, and a longitudinal axis. A curved glass heel extends from an outer end the bottom to the first end of the tube. The outer surface has a topography defined by a function $\hat{h}(x)$ that is an azimuthal average of a distance between a contact plane and the outer surface at any given position located on a circle having the centre and the radius $|x|$. The values $\hat{h}$ for $\hat{h}(x)$ are determined for a plurality of circles the radius of which increases stepwise by 500 μm starting with a circle around the centre having a radius of 500 μm. The values $\hat{h}$ are determined in a range from $x=-0.4 \times d2/2$ to $x=+0.4 \times d2/2$, d2 having a size such that at least 4 values $\hat{h}$ are determined and can be fitted with a curvature function
(Continued)

$$\hat{h}(x) = \frac{-c \times x^2}{1 + \sqrt{1 - c^2 \times x^2}} + h_0.$$

20 Claims, 11 Drawing Sheets

(51) Int. Cl.
  *B01L 3/00* (2006.01)
  *B65D 81/30* (2006.01)
  *C03B 23/08* (2006.01)
  *C03B 23/09* (2006.01)
  *C03B 23/11* (2006.01)
  *A61J 1/05* (2006.01)
(52) U.S. Cl.
  CPC ............. *C03B 23/08* (2013.01); *C03B 23/09* (2013.01); *C03B 23/112* (2013.01); *A61J 1/05* (2013.01); *B01L 2300/0832* (2013.01); *B01L 2300/0851* (2013.01)
(58) Field of Classification Search
  USPC ........................................................ 215/370
  See application file for complete search history.

(56) References Cited

U.S. PATENT DOCUMENTS

| | | | |
|---|---|---|---|
| 3,874,867 A | 4/1975 | Dichter | |
| 5,263,615 A * | 11/1993 | Anderson | B65D 47/122 222/212 |
| D419,452 S * | 1/2000 | DeVore | D9/500 |
| 6,363,750 B1 | 4/2002 | Chiodo | |
| D536,616 S * | 2/2007 | Rubin | D9/520 |
| D561,026 S * | 2/2008 | Rica | D9/520 |
| D635,856 S * | 4/2011 | Lauret | D9/500 |
| D647,405 S * | 10/2011 | Lauret | D9/539 |
| D785,455 S * | 5/2017 | James | D9/503 |
| 10,472,118 B2 * | 11/2019 | Pedmo | B65D 1/0246 |
| 10,968,005 B2 * | 4/2021 | Arregui Letamendi | B65D 1/0276 |
| 11,014,701 B2 * | 5/2021 | Langsdorf | C03B 23/045 |
| 11,376,191 B2 * | 7/2022 | Langsdorf | B65D 1/0261 |
| 11,634,248 B2 * | 4/2023 | Rizzo | B29C 49/4252 215/12.1 |
| 2003/0134060 A1 * | 7/2003 | Walther | C03C 17/22 428/34.6 |
| 2006/0267250 A1 | 11/2006 | Gerretz | |
| 2013/0334259 A1 * | 12/2013 | White | B65D 83/0005 222/386 |
| 2014/0326695 A1 * | 11/2014 | Paredes | B65D 1/0223 215/382 |
| 2015/0102004 A1 * | 4/2015 | Kelly | B65D 1/0223 220/675 |
| 2015/0147497 A1 * | 5/2015 | Brouwer | B65D 1/023 65/83 |
| 2016/0016841 A1 | 1/2016 | Frost | |
| 2016/0107918 A1 * | 4/2016 | Delgado Carranza | C03B 23/11 65/110 |
| 2016/0130170 A1 | 5/2016 | Maennl | |
| 2016/0244354 A1 | 8/2016 | Segner | |
| 2016/0256910 A1 * | 9/2016 | Niec | B21D 26/049 |
| 2018/0265243 A1 * | 9/2018 | Gutekunst | B65D 1/42 |
| 2019/0263707 A1 | 8/2019 | Frost | |
| 2019/0350806 A1 * | 11/2019 | Langsdorf | C03B 23/099 |
| 2020/0072736 A1 | 3/2020 | Long | |
| 2020/0307850 A1 * | 10/2020 | Melrose | B65D 79/005 215/370 |
| 2020/0399165 A1 * | 12/2020 | Frost | C03C 23/0075 |
| 2021/0188687 A1 * | 6/2021 | Frost | B65D 1/0261 |
| 2022/0168185 A1 * | 6/2022 | Redkar | A61J 1/1412 |
| 2022/0409484 A1 * | 12/2022 | Evans, II | A61K 39/099 |

FOREIGN PATENT DOCUMENTS

| | | |
|---|---|---|
| CN | 105906193 | 8/2016 |
| CN | 207391262 | 5/2018 |
| EP | 1754688 | 2/2007 |

OTHER PUBLICATIONS

Section 3.2.1 of the European Pharmacopoeia, 7th edition from 2011, 5 pages.
ISO 7884-6:1987, "Glass—Viscosity and viscometric fixed points—Part 6: Determination of softening point", First Edition, Dec. 15, 1987, 8 pages.
DIN EN ISO 8362-1, Injection containers and accessories—Part 1: Injection vials made of glass tubing:, Jun. 2016, 15 pages.

* cited by examiner

GLASS CONTAINER COMPRISING A GLASS BOTTOM WITH IMPROVED PROPERTIES

CROSS REFERENCE TO RELATED APPLICATIONS

This application claims benefit under 35 USC § 119 of European Application 19219010.6 filed Dec. 20, 2019, the entire contents of which are incorporated herein by reference.

BACKGROUND

1. Field of the Invention

The present invention relates to a glass container and to a plurality of glass containers, wherein the glass container or each glass container contained in the plurality of glass containers is characterized by an advantageous contour of the outer surface of the circular glass bottom. The present invention also relates to a process for the determination of a physical property of a material that is contained in such a glass container and to the use of a glass container or of a plurality of glass containers for determining a physical property of a material contained in the glass container.

2. Description of Related Art

Glass bottles that are used for pharmaceutical purposes (also known as so-called "vials") are usually prepared from borosilicate glass by hot-forming a borosilicate glass tube. In such a process in a first step the orifice of the vial is formed from the open tube end, wherein this orifice often has the form of a rolled-rim. Thereafter the vial bottom is formed and simultaneously the vial is separated from the residual of the glass tube. For the formation of the vial bottom the glass tube is, for example, secured in a vertical position by means of upper and lower clamping chucks and is then rotated around its longitudinal axis. The rotating glass tube in a certain region is heated by one or two separating gas burners until the heated mass of glass becomes deformable. As soon as this temperature is reached, the tube—under continuing rotation and heating by means of the burner—is extended in axial direction by means of a linear downwards movement of the lower chuck. Thereby the tube in the heated region extends under simultaneous tapering of its diameter, so that a constriction region in the form of a glass thread is formed. After the downward movement the constriction region is further heated. In this way the glass tube at the constriction region further contracts by means of the flow pressure of the burner gases so that the glass walls in the heated region melt together and finally the connection between the upper and the lower tube region pulls off. Thus, two tube regions (or sections) with closed ends are generated, wherein the lower tube region is the final vial, and the upper tube region is the residual glass tube from which further vials can be formed.

During the above-described thermal separation of the lower and the upper tube region, a mem-brane-like bottom is created. In order to provide a bottom thickness that roughly corresponds to the tube wall thickness, the glass in the bottom region has to be kept liquefied under the most massive supply of heat. However, the centrifugal force prevents the glass from penetrating to the centre of the bottom, i.e., to the centre of rotation. A large part gets stuck at about ⅔ of the bottom radius and forms a typical "ring bead".

Furthermore, when the upper and lower tube regions are drawn apart from each other in the process described above and when in the course of that process a progressive, rotationally symmetrical constriction of the tube occurs until only one thread remains, this tread finally breaks off near its upper end where the gas separation burner are located. The thread essentially falls downwards onto the membrane-like floor in the middle, where it forms an accumulation of glass mass called "the knot". The minimum bottom thickness is usually found between the ring bead and the knot, the thickest part is usually the knot itself.

In addition to the formation of structures such as the "ring bead" and the "knot", further irregular structures such as ultrafine fissures can also be observed on the outside of the glass bottom. Such structures are often the result of bringing the outer surface of the glass bottom of the glass container into contact with molding tools which in a conventional process for producing glass tubes are used to finally shape the circular glass bottom while still being in a molten state. The roughness of the surface of the molding tools also effects the structure on the outer surface of the glass bottom.

It has been observed that state of the art glass containers, particularly the state of art pharmaceutical vials that have been prepared by means of the conventional process as described above can often only be inspected optically through the glass bottom to an insufficient extent in an optical inspection machine. The reason for this limited inspection capability is—in addition to the lens effect of the glass bottom caused by the bottom indentation—a non-uniform structure of the outer surface of the glass bottom, which leads to undesired light refracting effects. As a consequence of these light refracting effects a large number of results cannot be interpreted by these inspection machines and the corresponding glass containers are therefore ejected from the automated process.

SUMMARY

In general, it is an object of the present invention to at least partly overcome a disadvantage arising from the prior art. It is a particular object of the present invention to provide a glass container, preferably a pharmaceutical vial, that shows an improved inspection capability through the glass bottom, compared to glass containers known from the prior art. Moreover, the glass containers, preferably a pharmaceutical vial, should be characterized in that they can be inspected in an optical inspection machine with a reduced number of glass containers that are ejected because the result obtained by optical inspection of that glass container cannot be interpreted.

A contribution to solving at least one of the objects according to the invention is made by an embodiment 1 of a glass container comprising as container parts a glass tube with a first end, a further end, an outer diameter d1, an inner diameter d2 and a glass thickness s1, the glass tube being characterized by a longitudinal axis $L_{tube}$ that passes through the centre of the first and the further end; a circular glass bottom, wherein the circular glass bottom closes the glass tube at the first end, wherein the circular glass bottom comprises an inner surface directed to the inside of the glass container, an outer surface directed to the outside of the glass container and a centre; a curved glass heel extending from an outer end of the circular glass bottom to the first end of the glass tube; wherein the topography of the outer surface of the circular glass bottom is defined by a function $\hat{h}(x)$, wherein $\hat{h}(x)$ is the azimuthal average of the distance $\hat{h}$ between a contact plane representing the ground on which the glass container rests with at least a part of the circular glass bottom being in contact with the ground, and the outer surface of the circular glass bottom at any given position that is located on a circle having the centre and the radius |x|, wherein individual values ĥ are determined for a plurality of circles the radius of which increases stepwise by 500 μm, starting with a circle around the centre having a radius of 500 μm, and wherein the individual values ĥ are determined in the range from x=0.4×d2/2 to x=+0.4×d2/2, d2 having a size such that at least 4 values ĥ, more preferably at least 5 values ĥ, even more preferably at least 6 values ĥ and most preferably at least 10 values ĥ are determined, wherein the thus obtained individual values ĥ can be fitted in a least square fit with a curvature function (I)

$$\hat{h}(x) = \frac{-c \times x^2}{1 + \sqrt{1 - c^2 \times x^2}} + h_0 \quad (I)$$

wherein c and $h_0$ are free fitting parameters, and wherein Δc is the standard deviation error for constant c when fitting the individual values ĥ(x) with curvature function (I) and wherein the relative standard deviation error Δc/c is less than 0.1.

A contribution to solving at least one of the objects according to the invention is also made by an embodiment 1 of a plurality of glass containers, each glass container comprising as contain-er parts a glass tube with a first end, a further end, an outer diameter d1, and an inner diameter d2 and a glass thickness s1, the glass tube being characterized by a longitudinal axis $L_{tube}$ that passes through the centre of the first and the further end; a circular glass bottom, wherein the circular glass bottom closes the glass tube at the first end, wherein the circular glass bottom comprises an inner surface directed to the inside of the glass container, an outer surface directed to the outside of the glass container and a centre; a curved glass heel extending from an outer end of the circular glass bottom to the first end of the glass tube; wherein the topography of the outer surface of the circular glass bottom is defined by a function ĥ(x), wherein ĥ(x) is the azimuthal average of the distance h between a contact plane representing the ground on which the glass container rests with at least a part of the circular glass bottom being in contact with the ground and the outer surface of the circular glass bottom at any given position that is located on a circle having the centre and the radius |x|, wherein individual values ĥ are determined for a plurality of circles the radius of which increases stepwise by 500 μm, starting with a circle around the centre having a radius of 500 μm, and wherein the individual values ĥ are determined at least in the range from x=−0.4×d2/2 to x=+0.4×d2/2, d2 having a size such that at least 4 values ĥ, more preferably at least 5 values ĥ, even more preferably at least 6 values ĥ and most preferably at least 10 values ĥ are determined, wherein the thus obtained individual values ĥ can be fitted in a least square fit with a curvature function (I)

$$\hat{h}(x) = \frac{-c \times x^2}{1 + \sqrt{1 - c^2 \times x^2}} + h_0 \quad (I)$$

wherein c and $h_0$ are free fitting parameters, and wherein Δc is the standard deviation error for constant c when fitting the individual values ĥ(x) with curvature function (I) and wherein for at least 90% of the glass containers in the plurality of glass containers the relative standard deviation error Δc/c is less than 0.1.

As used herein, the term "plurality of glass containers" in the sense of the present invention preferably comprises at least 10 glass containers, preferably at least 25 glass containers, more preferably at least 50 glass containers, even more preferably at least 75 glass containers and most preferably at least 100 glass containers. Preferably, the plurality of glass containers comprises at most 1000 glass container, more preferably at most 500 glass containers. Furthermore, the plurality of glass containers preferably has been collected arbitrarily and particularly has not been selected with regard to any property. For example, the plurality of glass containers may be the group of containers which are packed together in a typical transport tray.

If the circular glass bottom of a glass container, particularly the circular glass bottom of a vial, is characterized by an outer surface the contour of which can be fitted in a least square fit with the profile of a sphere having the Radius R with a curvature function as shown above in which the relative standard deviation error (or relative fitting error) Δc/c is less than 0.1, it has surprisingly been discovered that the inspection capability through the glass bottom can be significantly increased compared to circular glass bottoms of glass containers known from the prior art.

In an embodiment 2 of the glass container or the plurality of glass containers according to the invention the glass container or the plurality of glass containers is designed according to its embodiment 1, wherein for the individual values fa that have been determined in the range from x=−0.6×d2/2 to x=+0.6×d2/2 the relative standard deviation error Δc/c is less than 0.1.

In an embodiment 3 of the glass container or the plurality of glass containers according to the invention the glass container or in the plurality of glass containers is designed according to its embodiment 1 or 2, wherein for the individual values b that have been determined in the range from x=−0.8×d2/2 to x=+0.8×d2/2 the relative standard deviation error Δc/c is less than 0.1.

In an embodiment 4 of the glass container or the plurality of glass containers according to the invention the glass container or the plurality of glass containers is designed according to anyone of its embodiments 1 to 3, wherein for the individual values b that have been determined in the range from x=−0.4×d2/2 to x=+0.4×d2/2 the relative standard deviation error Δc/c is less than 0.09.

In an embodiment 5 of the glass container or the plurality of glass containers according to the invention the glass container or the plurality of glass containers is designed according to anyone of its embodiments 1 to 4, wherein for the individual values b that have been determined in the range from x=−0.6×d2/2 to x=+0.6×d2/2 the relative standard deviation error Δc/c is less than 0.09.

In an embodiment 6 of the glass container or the plurality of glass containers according to the invention the glass container or in the plurality of glass containers is designed according to anyone of its embodiments 1 to 5, wherein for the individual values ĥ that have been determined in the range from x=−0.8×d2/2 to x=+0.8×d2/2 the relative standard deviation error Δc/c is less than 0.09.

In an embodiment 7 of the glass container or the plurality of glass containers according to the invention the glass container or the plurality of glass containers is designed according to anyone of its embodiments 1 to 6, wherein the relative standard deviation error Δc/c is less than 0.08, preferably less than 0.07, more preferably less than 0.06, even more preferably less than 0.05, even more preferably less than 0.04 and even more preferably less than 0.03.

In an embodiment 8 of the glass container or the plurality of glass containers according to the invention the glass container or the plurality of glass containers is designed according to anyone of its embodiments 1 to 7, wherein for the wavefront distortion $W(\varrho,\varphi)$ of the laser light with a wave length of 520 nm, a beam width of at least $0.6 \times d2$ and less than $0.85 \times d2$, that passes through the circular glass bottom in a direction from the outer surface to the inner surface, that is aligned collinear with $L_{tube}$ and that has been corrected for piston, tilt and defocus, wherein the peak to valley difference $$(W(\varrho,\varphi)_{corrected})_{max} - (W(\varrho,\varphi)_{corrected})_{min}$$

is less than 100 waves, preferably less than 80 waves, more preferably less than 60 waves, even more preferably less than 40 waves, even more preferably less than 30 waves, even more preferably less than 20 waves and even more preferably less than 10 waves.

In an embodiment 9 of the glass container or the plurality of glass containers according to the invention the glass container or the plurality of glass containers is designed according to anyone of its embodiment 1 to 8, wherein for the wavefront distortion $W(\varrho,\varphi)$ of the laser light with a wave length of 520 nm, a beam width of at least $0.6 \times d2$ and less than $0.85 \times d2$, that passes through the circular glass bottom in a direction from the outer surface to the inner surface, that is aligned collinear with $L_{tube}$ and that has been corrected for piston and tilt, wherein the corrected wavefront distortion is point symmetric, wherein for a fixed set of radii $\varrho_0=\frac{1}{4}$, $\varrho_0=\frac{1}{2}$ and $\varrho_0=1$, the azimuthal peak to valley difference $$(W(\varrho_0,\varphi)_{corrected})_{max} - (W(\varrho_0,\varphi)_{corrected})_{min}$$

is less than 100 waves, preferably less than 80 waves, more preferably less than 60 waves, even more preferably less than 40 waves, even more preferably less than 30 waves, even more preferably less than 20 waves and even more preferably less than 10 waves.

In an embodiment 10 of the glass container or the plurality of glass containers according to the invention the glass container or the plurality of glass containers is designed according to anyone of its embodiments 1 to 9, wherein at least within the range from $x=-0.4 \times d2/2$ to $x=+0.4 \times d2/2$ the maximum value for $\hat{h}(x)$ that the fitted curvature function takes on in that range is $\hat{h}(x)_{max}$, $\hat{h}(x)_{max}$ being in the range from 0.01 to 0.25 mm when d1 is in the range from 6 to 14 mm, $\hat{h}(x)_{max}$ being in the range from 0.3 to 0.5 mm when d1 is in the range from 16 to 24 mm and $\hat{h}(x)_{max}$ being in the range from 1 to 2 mm when d1 is in the range from 30 to 50 mm. $\hat{h}(x)$ usually reaches its maximum value $\hat{h}(x)_{max}$ at the centre of the circular glass bottom (x=0). According to a particular embodiment of the glass container or the plurality of glass containers according to the present invention value $\hat{h}(x)_{max}$ represents the bottom indentation t.

In an embodiment 11 of the glass container or the plurality of glass containers according to the invention the glass container or the plurality of glass containers is designed according to anyone of its embodiments 1 to 10, wherein $\hat{h}(x,y)$ is the two-dimensional distance between a contact plane representing the ground on which the glass container rests with the circular glass bottom being at least partially in contact with the ground, and the outer surface of the circular glass bottom at a given position x,y, with x=0 and y=0 in the centre of the circular glass bottom, the two-dimensional distance being measured in a direction that is parallel to the longitudinal axis $L_{tube}$, wherein $$\sqrt{(dh/dx)^2 + (dh/dy)^2}$$

is the slope magnitude of the outer surface of the circular glass bottom at the given position x,y, wherein the 75% quantile of the values that have been determined for the term $$\sqrt{(dh/dx)^2 + (dh/dy)^2} \times d1/h(x,y)_{delta}$$

for all given positions x,y within a circular area having a radius of $0.4 \times d2/2$ and a centre that corresponds to the centre of the glass bottom, is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm, wherein adjacent positions x,y increase stepwise by 200 µm and wherein $h(x,y)_{delta} = h(x,y)_{max} - h(x,y)_{min}$, $h(x,y)_{max}$ being the maximum value for $h(x,y)$ and $h(x,y)_{min}$ being the minimum value for $h(x,y)$ being determined in that circular area.

In an embodiment 12 of the glass container or the plurality of glass containers according to the invention the glass container or the plurality of glass containers is designed according to its embodiment 11, wherein the 75% quantile of the values that have been determined for the term $$\sqrt{(dh/dx)^2 + (dh/dy)^2} \times d1/h(x,y)_{delta}$$

within a circle having a radius of $0.6 \times d2/2$ and a centre that corresponds to the centre of the glass bottom, is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm.

In an embodiment 13 of the glass container or the plurality of glass containers according to the invention the glass container or the plurality of glass containers is designed according to its embodiment 11 or 12, wherein the 75% quantile of the values that have been determined for the term $$\sqrt{(dh/dx)^2 + (dh/dy)^2} \times d1/h(x,y)_{delta}$$

within a circle having a radius of $0.8 \times d2/2$ and a centre that corresponds to the centre of the glass bottom, is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm.

In an embodiment 14 of the glass container or the plurality of glass containers according to the invention the glass container or the plurality of glass containers is designed according to anyone of its embodiments 11 to 13, wherein $\hat{h}(x,y)_{delta}$ is at least 30 µm, preferably at least 50 µm, more preferably at least 75 µm and even more preferably at least 100 µm.

In an embodiment 15 of the glass container or the plurality of glass containers according to the invention the glass container or the plurality of glass containers is designed according to anyone of its embodiments 1 to 14, wherein for any cut surface of the circular glass bottom that is obtainable by cutting the circular glass bottom in a plane that includes the longitudinal axis $L_{tube}$ the following condition is fulfilled: $s2_{max}/s1 \times (s2_{max}/s2_{min}-1) \leq 1.1$; preferably $s2_{max}/s1 \times (s2_{max}/s2_{min}-1) \leq 1.0$; more preferably $s2_{max}/s1 \times (s2_{max}/s2_{min}-1) \leq 0.9$; even more preferably $s2_{max}/s1 \times (s2_{max}/s2_{min}-1) \leq 0.8$; even more preferably $s2_{max}/s1 \times (s2_{max}/s2_{min}-1) \leq 0.7$; even more preferably $s2_{max}/s1 \times (s2_{max}/s2_{min}-1) \leq 0.6$; even more preferably $s2_{max}/s1 \times (s2_{max}/s2_{min}-1) \leq 0.5$; even more preferably $s2_{max}/s1 \times (s2_{max}/s2_{min}-1) \leq 0.4$; even more preferably $s2_{max}/s1 \times (s2_{max}/s2_{min}-1) \leq 0.3$; even more preferably $s2_{max}/s1 \times (s2_{max}/s2_{min}-1) \leq 0.2$; most preferably $s2_{max}/s1 \times (s2_{max}/s2_{min}-1) \leq 0.1$; wherein $s2_{max}$ corresponds to the maximum glass thickness of the circular glass bottom and $s2_{min}$ to the minimum glass thickness of the circular glass bottom as determined within a given cut surface at least within the range from $x=-0.4 \times d2/2$ to $x=+0.4 \times d2/2$, the centre of the circular glass bottom being at position $x=0$, wherein $s2_{min}$ and $s2_{max}$ are both measured in a direction that is parallel to the longitudinal axis $L_{tube}$.

In an embodiment 16 of the glass container or the plurality of glass containers according to the invention the glass container or the plurality of glass containers is designed according to its embodiment 15, wherein $s2_{max}$ and $s2_{min}$ are determined within a given cut surface at least within the range from $x=-0.6 \times d2/2$ to $x=+0.6 \times d2/2$.

In an embodiment 17 of the glass container or the plurality of glass containers according to the invention the glass container or the plurality of glass containers is designed according to its embodiment 15 or 16, wherein $s2_{max}$ and $s2_{min}$ are determined at least within a given cut surface within the range from $x=-0.8 \times d2/2$ to $x=+0.8 \times d2/2$.

In an embodiment 18 of the glass container or the plurality of glass containers according to the invention the glass container or the plurality of glass containers is designed according to anyone of its embodiments 1 to 17, wherein the glass container comprises a top region in which the inner diameter is d4 and a body region in which the inner diameter of the glass tube is d2, wherein d2>d4 and wherein the glass container comprises a shoulder that connects the body region with the top region. Preferably, the shoulder is characterized by a shoulder angle $\alpha$, wherein $\alpha$ is in the range from 10 to 70°, preferably in the range from 15 to 60°, more preferably in the range from 20 to 50°, even more preferably in the range from 25 to 40° and most preferably in the range from 27° to 33°.

In an embodiment 19 of the glass container or the plurality of glass containers according to the invention the glass container or the plurality of glass containers is designed according to its embodiment 18, wherein the glass container in the container part from the glass bottom up to the shoulder is rotation-symmetric around the longitudinal axis $L_{tube}$ that goes perpendicular through the centre of the glass bottom.

In an embodiment 20 of the glass container or the plurality of glass containers according to the invention the glass container or the plurality of glass containers is designed according to its embodiment 18 or 19, wherein d4 is in the range from 5 to 20 mm, preferably in the range from 7 to 14 mm and more preferably in the range from 6 to 8 mm.

In an embodiment 21 of the glass container or the plurality of glass containers according to the invention the glass container or the plurality of glass containers is designed according to anyone of its embodiments 18 to 20, wherein throughout the body region the glass thickness s1 of the glass tube is in a range from ±0.2 mm, preferably ±0.1 mm, more preferably ±0.08 mm and most preferably ±0.05 mm, in each case based on a mean value of this glass thickness in the body region.

In an embodiment 22 of the glass container or the plurality of glass containers according to the invention the glass container or the plurality of glass containers is designed according to anyone of its embodiments 1 to 21, wherein d2 is in the range from 10 to 60 mm, preferably in the range from 12 to 50 mm, more preferably in the range from 12 to 30 mm, even more preferably in the range from 12 to 25 mm and most preferably in the range from 12 to 17 mm.

In an embodiment 23 of the glass container or the plurality of glass containers according to the invention the glass container or the plurality of glass containers is designed according to anyone of its embodiments 1 to 22, wherein s1 is in the range from 0.5 to 3.0 mm, preferably in the range from 0.7 to 1.8 mm, more preferably in the range from 0.8 to 1.2 mm, even more preferably in the range from 0.9 to 1.1 mm and most preferably in the range from 0.95 to 1.05 mm.

In an embodiment 24 of the glass container or the plurality of glass containers according to the invention the glass container or the plurality of glass containers is designed according to anyone of its embodiments 1 to 23, wherein the glass container has a mass of glass $m_g$ and an interior volume $V_i$ and wherein the following condition is fulfilled: $m_g/V_i^{0.75} < 2.0$, preferably $m_g/V_i^{0.75} < 1.75$.

In an embodiment 25 of the glass container or the plurality of glass containers according to the invention the glass container or the plurality of glass containers is designed according to anyone of its embodiments 1 to 24, wherein the glass container has an interior volume $V_i$ in a range from 2 to 150 ml, preferably from 3 to 100 ml, more preferably from 3 to 50 ml, even more preferably from 3 to 15 ml, most preferably from 3 to 7 ml.

In an embodiment 26 of the glass container or the plurality of glass containers according to the invention the glass container or the plurality of glass containers is designed according to anyone of its embodiments 1 to 25, wherein the glass container has a height h1 in the range from 15 to 100 mm, preferably in the range from 20 to 60 mm, more preferably in the range from 25 to 55 mm, even more preferably in the range from 30 to 50 mm and most preferably in the range from 34 to 46 mm.

In an embodiment 27 of the glass container or the plurality of glass containers according to the invention the glass container or the plurality of glass containers is designed according to anyone of its embodiments 1 to 26, wherein d1 is in the range from 13 to 65 mm, preferably in the range from 15 to 55 mm, more preferably in the range from 15 to 35 mm, even more preferably in the range from 15 to 30 mm and most preferably in the range from 15 to 20 mm.

In an embodiment 28 of the glass container or the plurality of glass containers according to the invention the glass container or the plurality of glass containers is designed according to anyone of its embodiments 1 to 27, wherein at least one of the properties of the glass container selected from the group consisting of s1, d1, h1 and t is within the requirements defined in DIN EN ISO 8362-1:2016-06.

In an embodiment 29 of the glass container or the plurality of glass containers according to the invention the glass container or the plurality of glass containers is designed according to anyone of its embodiments 1 to 28, wherein the glass container is a packaging container for a medical or a pharmaceutical packaging good or both. A preferred pharmaceutical packaging good is a pharmaceutical composition. Preferably, the glass container 1 is suitable for packaging parenteralia in accordance with section 3.2.1 of the European Pharmacopoeia, 7th edition from 2011.

In an embodiment 30 of the glass container or the plurality of glass containers according to the invention the glass container or the plurality of glass containers is designed according to anyone of its embodiments 1 to 29, wherein the glass container is a vial.

In an embodiment 31 of the glass container or the plurality of glass containers according to the invention the glass container or the plurality of glass containers is designed according to anyone of its embodiments 1 to 30, wherein the glass is of a type selected from the group consisting of a borosilicate glass, an aluminosilicate glass, soda lime glass and fused silica. As used herein, the term "soda lime glass" according to the invention is an alkaline/alkaline earth/silicate glass according to table 1 of ISO 12775 (1$^{st}$ edition 1997-10-15).

In an embodiment 32 of the glass container or the plurality of glass containers according to the invention the glass container or the plurality of glass containers is designed according to anyone of its embodiments 1 to 31, wherein the glass container comprises a pharmaceutical composition.

In an embodiment 33 of the glass container or the plurality of glass containers according to the invention the glass container or the plurality of glass containers is designed according to anyone of its embodiments 1 to 32, wherein the glass container comprises a closure at the top of the glass container, preferably a lid.

A contribution to solving at least one of the objects according to the invention is also made by a process for the determination of a physical property of a material that is contained in a glass container comprising as process step: providing a glass container or a plurality of glass containers according to anyone of embodiments 1 to 33, wherein the glass container or each glass container in the plurality of glass containers contains the material; determining the physical property of the material by a radiation that passes through the bottom of the glass container.

In an embodiment 2 of the process according to the invention the process is designed according to its embodiment 1, wherein the material is a pharmaceutical composition, preferably a liquid or solid pharmaceutical composition, more preferably a freeze-dried product or a liquid comprising at least one drug dissolved or dispersed therein.

In an embodiment 3 of the process according to the invention the process is designed according to its embodiment 1 or 2, wherein the physical property of the material is determined by radiation in an optical inspection machine, preferably in an automated optical inspection machine.

In an embodiment 4 of the process according to the invention the process is designed according to anyone of its embodiment 1 to 3, wherein the physical property is selected from the group consisting of the transmission, the colour, the refractive index and the absorption at a given wavelength of electromagnetic radiation.

A contribution to solving at least one of the objects according to the invention is also made by the use of a glass container or a plurality of glass containers according to anyone of embodiments 1 to 33 for determining a physical property of a material contained in the glass container.

Process for Producing the Glass Container

The glass container according to the present invention or the glass containers contained in the plurality of glass containers according to the present invention is preferably produced by means of an embodiment 1 of a process for the preparation of a glass container from a glass tube in a glass processing machine, wherein the glass tube comprises a first portion with a first end, a second portion with a second end and a longitudinal axis $L_{tube}$ that passes through the centre of the first and the second end, wherein the glass processing machine comprises a plurality of processing stations and pairs of first and second clamping chucks which are adapted and arranged to hold the glass tube while rotating the glass tube around its longitudinal axis $L_{tube}$ and to transport the rotating glass tube from one glass container processing station to the next one, wherein the first clamping chucks hold the glass tube at first portion and the second clamping chucks hold the glass tube at the second portion, wherein the process comprises the steps of heating the glass tube at a defined position between the first portion and the second portion by means of at least one separation gas burner to a temperature above the glass transition temperature, preferably above its softening temperature, while the glass tube is rotating around its longitudinal axis $L_{tube}$; pulling apart the first portion and the second portion of the heated glass tube, while the heated glass tube is still rotating around its longitudinal axis $L_{tube}$, in a direction that is substantially parallel to the longitudinal axis $L_{tube}$ by moving the first and the second clamping chucks away from each other, thereby forming a glass thread and separating the first portion from the second portion by pulling apart the glass thread, the part of the mass of the glass thread that remains at a portion of the glass tube forming a circular bottom at one end of that portion; characterized in that, while moving away the first and the second clamping chucks in process step III), at least one separation gas burner follows at least one portion of the glass tube selected from the first portion and the second portion in a direction that is substantially parallel to the direction in which the first and the second clamping chucks are moved away from each other, the at least one separation gas burner thereby following the one end of at least one portion of the glass tube selected from the first portion and the second portion.

Surprisingly, it has been discovered that if at least one separation gas burner follows at least one portion of the glass tube in the separation process an advantageous bottom geometry of the glass container can be obtained, compared to the bottom geometry obtained in a prior art process in which the separation gas burners remain in a fixed position. The present invention thus simplifies the production of vials by creating the required bottom geometry during the separation process and thereby enables a new, unprecedented quality of the bottom geometry that is ideal for automated inspection processes, both unfilled and filled.

As used herein, the term "softening temperature" of the glass is the temperature at which the glass has a viscosity (determined according to ISO 7884-6:1987) of $10^{7.6}$ dPa×sec.

In an embodiment 2 of the process for the preparation of a glass container, the process is designed according to its embodiment 1, wherein in process step II) two diametrically opposed separation gas burners are used which are arranged such that the glass tube rotates centrally between the two flames generated by these two separation gas burners.

In an embodiment 3 of the process for the preparation of a glass container, the process is designed according to its embodiment 1 or 2, wherein the first and second clamping chucks are adapted and arranged to hold the glass tube in a vertical position; wherein the first portion of the glass tube corresponds to the lower portion of the glass tube having a lower end and the second portion of the glass tube corresponds to the upper portion of the glass tube having an upper end; wherein the first clamping chucks are arranged as upper clamping chucks holding the upper portion of the glass tube and the second clamping chucks are arranged as lower clamping chucks holding the lower part of the glass tube; wherein in process step III) the lower portion of the glass tube is pulled downwards by moving downwards the lower clamping chucks and wherein, while pulling downwards the lower portion, the at least one separation gas burner is moved downwards in a direction that is substantially parallel to the direction in which the lower clamping chucks are moved downwards, the at least one separation gas burner thereby following the upper end of the lower portion.

In an embodiment 4 of the process for the preparation of a glass container, the process is designed according to its embodiment 3, wherein in process step III) the lower clamping chucks are moved downwards at a point of time t and the at least one separation gas burner is moved downwards at a point of time t'=t+Δt.

In an embodiment 5 of the process for the preparation of a glass container, the process is designed according to its embodiment 4, wherein Δt=0 sec. In this particular embodiment of the process the at least one separation gas burner and the lower clamping chucks (and thus also the lower portion of the glass tube) are moved downwards simultaneously.

In an embodiment 6 of the process for the preparation of a glass container, the process is designed according to its embodiment 4, wherein Δt is in the range from 0.01 to 1.0 sec, preferably in the range from 0.03 to 0.8 sec, more preferably in the range from 0.05 to 0.4 sec and even more preferably in the range from 0.1 to 0.2 sec.

In an embodiment 7 of the process for the preparation of a glass container, the process is designed according to anyone of its embodiments 2 to 6, wherein in process step III) the at least one separation gas burner is moved downwards starting from a position $Y'_0$ to a stop position $Y'_{stop}$ and the lower clamping chucks is moved downwards starting from a position $Y_0$ and, preferably after the at least one separation gas burner has stopped at position $Y'_{stop}$, to stop at a position $Y_{stop}$.

In an embodiment 8 of the process for the preparation of a glass container, the process is designed according to its embodiment 7, wherein $|Y'_{stop}-Y'_0|<|Y_{stop}-Y_0|$. According to this embodiment it is thus preferred that the distance with which the at least one separation gas burner is moved downwards is smaller than the distance with which the lower clamping chucks are moved downward.

In an embodiment 9 of the process for the preparation of a glass container, the process is designed according to its embodiment 8, wherein $(|Y'_{stop}-Y'_0|/|Y_{stop}-Y_0|)$ (i.e., the ratio of the distance with which the burner has been moved downwards to the distance with which the lower clamping chucks have been moved downwards) is in the range from 0.1 to 1, preferably in the range from 0.2 to 0.95, more preferably in the range from 0.3 to 0.9, even more preferably in the range from 0.4 to 0.85, even more preferably in the range from 0.5 to 0.8 and most preferably in the range from 0.6 to 0.75.

In an embodiment 10 of the process for the preparation of a glass container, the process is designed according to anyone of its embodiments 2 to 9, wherein the downward movements of the at least one separation gas burner and the lower clamping chucks are independent from each other. In this context it is particularly preferred that the downward movements of the at least one separation gas burner and the lower clamping chucks are accomplished through independent servo drives.

In an embodiment 11 of the process for the preparation of a glass container, the process is designed according to anyone of its embodiments 2 to 10, wherein the downward movements of the at least one separation gas burner and the lower clamping chucks are both linear synchronous with each other.

In an embodiment 12 of the process for the preparation of a glass container, the process is designed according to anyone of its embodiments 2 to 11, wherein the distance between the at least one separation gas burner and the upper end of the lower portion is kept constant when the at least one separation gas burner follows the upper end of the lower portion.

In an embodiment 13 of the process for the preparation of a glass container, the process is designed according to anyone of its embodiments 2 to 12, wherein the outer surface of the upper end of the lower portion does not come into contact with any part of the glass processing machine while the final shape of the circular glass bottom is formed.

In an embodiment 14 of the process for the preparation of a glass container, the process is designed according to anyone of its embodiments 2 to 13, wherein after process step III) in a further process step IV) the thickness of the glass in the circular glass bottom is equalized by heating the circular glass bottom, while still having a temperature above the glass transition temperature and while still rotating the lower portion of the glass tube around its longitudinal axis $L_{tube}$, with at least one bottom shaping gas burner, thereby forming the final shape of the circular glass bottom.

In an embodiment 15 of the process for the preparation of a glass container, the process is designed according to anyone of its embodiments 2 to 13, wherein after process step III) in a further process step IV) the thickness of the glass in the circular glass bottom is equalized by bringing the outer surface of the circular glass bottom, while still having a temperature above the glass transition temperature and while still rotating the lower portion of the glass tube around its longitudinal axis $L_{tube}$, into contact with a molding tool, thereby forming the final shape of the circular glass bottom.

In an embodiment 16 of the process for the preparation of a glass container, the process is designed according to anyone of its embodiments 2 to 13, wherein after process step III) in a further process step IV) the thickness of the glass in the circular glass bottom is equalized by heating the circular glass bottom, while still having a temperature above the glass transition temperature and while still rotating the lower portion of the glass tube around its longitudinal axis $L_{tube}$, with at least one bottom shaping gas burner, followed by a process step of bringing the outer surface of the circular glass bottom, while still having a temperature above the glass transition temperature and while still rotating the lower portion of the glass tube around its longitudinal axis $L_{tube}$, into contact with a molding tool, thereby forming the final shape of the circular glass bottom.

In an embodiment 17 of the process for the preparation of a glass container, the process is designed according to anyone of its embodiments 14 to 16, wherein the process comprises the further process step of heating the lower portion of the glass tube at the lower end by means of at least one further gas burner to a temperature above its glass transition temperature while rotating the glass tube around its longitudinal axis $L_{tube}$ and forming an orifice, preferably an orifice in the form of a flange or a rolled rim, at the lower end of the glass tube, wherein the processing stations of the glass processing machine are arranged along at least one circle, wherein the glass tube is passed along this circle from one processing station to the next one while rotating around its longitudinal axis $L_{tube}$, and wherein process steps I) to IV) are all carried out at processing stations which are arranged within the same circle.

Glass Container

The glass container according to the invention or the glass container contained in the plurality of glass containers according to the invention may have any size or shape which the skilled person deems appropriate in the context of the invention. Preferably, the top region of the glass container comprises an opening, which allows for inserting a pharmaceutical composition into the interior volume of the glass container. A preferred glass container is a pharmaceutical glass container, more preferably one selected from the group consisting of a vial, an ampoule or a combination thereof, wherein a vial is particularly preferred.

For the use in this document, the interior volume V, represents the full volume of the interior of the glass container. This volume may be determined by filling the interior of the glass container with water up to the brim and measuring the volume of the amount of water which the interior can take up to the brim. Hence, the interior volume as used herein is not a nominal volume as it is often referred to in the technical field of pharmacy. This nominal volume may for example be less than the interior volume by a factor of about 0.5.

The following are particularly preferred embodiments of the glass container according to the present invention (or of the glass container contained in the plurality of glass containers according to the present invention). When reference is made to the relative standard deviation error $\Delta c/c$, the values for $\Delta c$ and $c$ are preferably determined by fitting the individual values $\hat{h}(x)$ that have been obtained within the range from $x=-0.8\times d2/2$ to $x=+0.8\times d2/2$ with curvature function (I). When reference is made to the 75% quantile of the values that have been determined for the term $$\sqrt{(dh/dx)^2+(dh/dy)^2}\times d1/h(x,y)_{delta},$$

this term has been determined for all given positions x,y within a circular area having a radius of $0.8\times d2/2$. When reference is made to the parameters $s2_{max}/s1\times(s2_{max}/s2_{min}-1)$, the corresponding value is also preferably determined within the range from $x=-0.8\times d2/2$ to $x=+0.8\times d2/2$.

According to a first preferred embodiment of the glass container according to the present invention (or of the glass container contained in the plurality of glass containers according to the present invention) the glass container is a vial with an overflow capacity equal to or larger than 1 ml up to maximal 5 ml, preferably a vial with a size designation "2R" according to DIN EN ISO 8362-1:2016-06, wherein it is furthermore preferred that at least one, preferably all of the following conditions is/are fulfilled: s1 is in the range from 0.4 to 2 mm, preferably in the range from 0.8 to 1.3 mm and more preferably in the range from 0.9 to 1.15 mm; d1 is in the range from 13 to 19 mm, preferably in the range from 14 to 18 mm and more preferably in the range from 15 to 17 mm; $\Delta c/c$ is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\hat{h}(x)_{max}$ is in the range from 0.01 to 0.75 mm, preferably in the range from 0.05 to 0.5 mm and even more preferably in the range from 0.08 to 0.12 mm; the 75% quantile of the values that have been determined the term $$\sqrt{(dh/dx)^2+(dh/dy)^2}\times d1/h(x,y)_{delta}$$

is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm; $s2_{max}/s1\times(s2_{max}/s2_{min}-1)$ is less than 1.1, preferably less than 0.8 and even more preferably less than 0.5.

According to a second preferred embodiment of the glass container according to the present invention the glass container is a vial with an overflow capacity of larger than 4 ml up to maximal 8 ml, preferably a vial with a size designation "4R" according to DIN EN ISO 8362-1:2016-06, wherein it is furthermore preferred that at least one, preferably all of the following conditions is/are fulfilled: s1 is preferably in the range from 0.9 to 1.15 mm; d1 is in the range from 13 to 19 mm, preferably in the range from 14 to 18 mm and even more preferably in the range from 15 to 17 mm; $\Delta c/c$ less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\hat{h}(x)_{max}$ is in the range from 0.01 to 0.75 mm, preferably in the range from 0.05 to 0.5 mm and even more preferably in the range from 0.08 to 0.12 mm; the 75% quantile of the values that have been determined the term $$\sqrt{(dh/dx)^2+(dh/dy)^2}\times d1/h(x,y)_{delta}$$

is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm; $s2_{max}/s1\times(s2_{max}/s2_{min}-1)$ is less than 1.1, preferably less than 0.8 and even more preferably less than 0.5.

According to a third preferred embodiment of the glass container according to the present invention the glass container is a vial with an overflow capacity of larger than 8 ml up to maximal 10.75 ml, preferably a vial with a size designation "6R" according to DIN EN ISO 8362-1:2016-06, wherein it is furthermore preferred that at least one, preferably all of the following conditions is/are fulfilled: s1 is preferably in the range from 0.9 to 1.15 mm; d1 is in the range from 19 to 25 mm, preferably in the range from 20 to 24 mm and even more preferably in the range from 21 to 23 mm; $\Delta c/c$ is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\hat{h}(x)_{max}$ is in the range from 0.01 to 0.75 mm, preferably in the range from 0.05 to 0.5 mm and even more preferably in the range from 0.08 to 0.12 mm; the 75% quantile of the values that have been determined the term $$\sqrt{(dh/dx)^2+(dh/dy)^2}\times d1/h(x,y)_{delta}$$

is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm; $s2_{max}/s1\times(s2_{max}/s2_{min}-1)$ is less than 1.1, preferably less than 0.8 and even more preferably less than 0.5.

According to a fourth preferred embodiment of the glass container according to the present invention the glass container is a vial with an overflow capacity of larger than 10.75 ml up to maximal 12.5 ml, preferably a vial with a size designation "8R" according to DIN EN ISO 8362-1:2016-06, wherein it is furthermore preferred that at least one, preferably all of the following conditions is/are fulfilled: s1 is preferably in the range from 0.9 to 1.15 mm; d1 is in the range from 19 to 25 mm, preferably in the range from 20 to 24 mm and even more preferably in the range from 21 to 23 mm; Δc/c is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\hat{h}(x)_{max}$ is in the range from 0.01 to 0.75 mm, preferably in the range from 0.05 to 0.5 mm and even more preferably in the range from 0.08 to 0.12 mm; the 75% quantile of the values that have been determined the term $$\sqrt{(dh/dx)^2+(dh/dy)^2} \times d1/h(x,y)_{delta}$$

is less than 4100 μm/mm, preferably less than 3900 μm/mm, more preferably less than 3700 μm/mm, even more preferably less than 3500 μm/mm, even more preferably less than 3300 μm/mm, even more preferably less than 3100 μm/mm, even more preferably less than 2900 μm/mm, even more preferably less than 2500 μm/mm and even more preferably less than 2000 μm/mm; $s2_{max}/s1 \times (s2_{max}/s2_{min}-1)$ is less than 1.1, preferably less than 0.8 and even more preferably less than 0.5.

According to a fifth preferred embodiment of the glass container according to the present invention the glass container is a vial with an overflow capacity of larger than 12.5 ml up to maximal 16.25 ml, preferably a vial with a size designation "10R" according to DIN EN ISO 8362-1:2016-06, wherein it is furthermore preferred that at least one, preferably all of the following conditions is/are fulfilled: s1 is preferably in the range from 0.9 to 1.15 mm; d1 is in the range from 21 to 27 mm, preferably in the range from 22 to 26 mm and even more preferably in the range from 23 to 25 mm; Δc/c is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\hat{h}(x)_{max}$ is in the range from 0.01 to 0.75 mm, preferably in the range from 0.05 to 0.5 mm and even more preferably in the range from 0.08 to 0.12 mm; the 75% quantile of the values that have been determined the term $$\sqrt{(dh/dx)^2+(dh/dy)^2} \times d1/h(x,y)_{delta}$$

is less than 4100 μm/mm, preferably less than 3900 μm/mm, more preferably less than 3700 μm/mm, even more preferably less than 3500 μm/mm, even more preferably less than 3300 μm/mm, even more preferably less than 3100 μm/mm, even more preferably less than 2900 μm/mm, even more preferably less than 2500 μm/mm and even more preferably less than 2000 μm/mm; $s2_{max}/s1 \times (s2_{max}/s2_{min}-1)$ is less than 1.1, preferably less than 0.8 and even more preferably less than 0.5.

According to a sixth preferred embodiment of the glass container according to the present invention the glass container is a vial with an overflow capacity of larger than 16.25 ml up to maximal 22.5 ml, preferably a vial with a size designation "15R" according to DIN EN ISO 8362-1:2016-06, wherein it is furthermore preferred that at least one, preferably all of the following conditions is/are fulfilled: s1 is in the range from 0.4 to 2 mm and preferably in the range from 0.9 to 1.15 mm; d1 is in the range from 21 to 27 mm, preferably in the range from 22 to 26 mm and even more preferably in the range from 23 to 25 mm; Δc/c is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\hat{h}(x)_{max}$ is in the range from 0.01 to 0.75 mm, preferably in the range from 0.05 to 0.5 mm and even more preferably in the range from 0.08 to 0.12 mm; the 75% quantile of the values that have been determined the term $$\sqrt{(dh/dx)^2+(dh/dy)^2} \times d1/h(x,y)_{delta}$$

is less than 4100 μm/mm, preferably less than 3900 μm/mm, more preferably less than 3700 μm/mm, even more preferably less than 3500 μm/mm, even more preferably less than 3300 μm/mm, even more preferably less than 3100 μm/mm, even more preferably less than 2900 μm/mm, even more preferably less than 2500 μm/mm and even more preferably less than 2000 μm/mm; $s2_{max}/s1 \times (s2_{max}/s2_{min}-1)$ is less than 1.1, preferably less than 0.8 and even more preferably less than 0.5.

According to a seventh preferred embodiment of the glass container according to the present invention the glass container is a vial with an overflow capacity of larger than 22.5 ml up to maximal 29.25 ml, preferably a vial with a size designation "20R" according to DIN EN ISO 8362-1:2016-06, wherein it is furthermore preferred that at least one, preferably all of the following conditions is/are fulfilled: s1 is in the range from 0.5 to 2.5 mm, preferably in the range from 0.9 to 1.6 mm and even more preferably in the range from 1.15 to 1.25 mm; d1 is in the range from 27 to 33 mm, preferably in the range from 28 to 32 mm and even more preferably in the range from 29 to 31 mm; Δc/c is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\hat{h}(x)_{max}$ is in the range from 0.05 to 0.75 mm, preferably in the range from 0.1 to 0.5 mm and even more preferably in the range from 0.15 to 0.25 mm; the 75% quantile of the values that have been determined the term $$\sqrt{(dh/dx)^2+(dh/dy)^2} \times d1/h(x,y)_{delta}$$

is less than 4100 μm/mm, preferably less than 3900 μm/mm, more preferably less than 3700 μm/mm, even more preferably less than 3500 μm/mm, even more preferably less than 3300 μm/mm, even more preferably less than 3100 μm/mm, even more preferably less than 2900 μm/mm, even more preferably less than 2500 μm/mm and even more preferably less than 2000 μm/mm; $s2_{max}/s1 \times (s2_{max}/s2_{min}-1)$ is less than 1.1, preferably less than 0.8 and even more preferably less than 0.5.

According to an eighth preferred embodiment of the glass container according to the present invention the glass container is a vial with an overflow capacity of larger than 29.25 ml up to maximal 35 ml, preferably a vial with a size designation "25R" according to DIN EN ISO 8362-1:2016-06, wherein it is furthermore preferred that at least one, preferably all of the following conditions is/are fulfilled: s1 is in the range from 0.5 to 2.5 mm, preferably in the range from 0.9 to 1.6 mm and even more preferably in the range from 1.15 to 1.25 mm; d1 is in the range from 27 to 33 mm, preferably in the range from 28 to 32 mm and even more preferably in the range from 29 to 31 mm; Δc/c is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\tilde{h}(x)_{max}$ is in the range from 0.05 to 0.75 mm, preferably in the range from 0.1 to 0.5 mm and even more preferably in the range from 0.15 to 0.25 mm; the 75% quantile of the values that have been determined the term $$\sqrt{(dh/dx)^2+(dh/dy)^2}\times d1/h(x,y)_{delta}$$

is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm; $s2_{max}/s1\times(s2_{max}/s2_{min}-1)$ is less than 1.1, preferably less than 0.8 and even more preferably less than 0.5.

According to a ninth preferred embodiment of the glass container according to the present invention the glass container is a vial with an overflow capacity of larger than 35 ml up to maximal 49.75 ml, preferably a vial with a size designation "30R" according to DIN EN ISO 8362-1:2016-06, wherein it is furthermore preferred that at least one, preferably all of the following conditions is/are fulfilled: s1 is in the range from 0.5 to 2.5 mm, preferably in the range from 0.9 to 1.6 mm and even more preferably in the range from 1.15 to 1.25 mm; d1 is in the range from 27 to 33 mm, preferably in the range from 28 to 32 mm and even more preferably in the range from 29 to 31 mm; Δc/c is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\tilde{h}(x)_{max}$ is in the range from 0.05 to 0.75 mm, preferably in the range from 0.1 to 0.5 mm and even more preferably in the range from 0.15 to 0.25 mm; the 75% quantile of the values that have been determined the term $$\sqrt{(dh/dx)^2+(dh/dy)^2}\times d1/h(x,y)_{delta}$$

is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm; $s2_{max}/s1\times(s2_{max}/s2_{min}-1)$ is less than 1.1, preferably less than 0.8 and even more preferably less than 0.5.

According to a tenth preferred embodiment of the glass container according to the present invention the glass container is a vial with an overflow capacity of larger than 49.75 ml up to maximal 92.5 ml, preferably a vial with a size designation "50R" according to DIN EN ISO 8362-1:2016-06, wherein it is furthermore preferred that at least one, preferably all of the following conditions is/are fulfilled: s1 is in the range from 0.4 to 2.5 mm, preferably in the range from 1.3 to 1.8 mm and even more preferably in the range from 1.45 to 1.55 mm; d1 is in the range from 37 to 43 mm, preferably in the range from 38 to 42 mm and even more preferably in the range from 39 to 41 mm; Δc/c is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\tilde{h}(x)_{max}$ is in the range from 0.075 to 1.2 mm, preferably in the range from 0.1 to 0.75 mm and even more preferably in the range from 0.15 to 0.25 mm; the 75% quantile of the values that have been determined the term $$\sqrt{(dh/dx)^2+(dh/dy)^2}\times d1/h(x,y)_{delta}$$

is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm; $s2_{max}/s1\times(s2_{max}/s2_{min}-1)$ is less than 1.1, preferably less than 0.8 and even more preferably less than 0.5.

According to an eleventh preferred embodiment of the glass container according to the present invention the glass container is a vial with an overflow capacity of larger than 92.5 ml up to maximal 150 ml, preferably a vial with a size designation "100R" according to DIN EN ISO 8362-1:2016-06, wherein it is furthermore preferred that at least one, preferably all of the following conditions is/are fulfilled: s1 is in the range from 0.4 to 2.5 mm, preferably in the range from 1.3 to 1.8 mm and even more preferably in the range from 1.65 to 1.75 mm; d1 is in the range from 44 to 50 mm, preferably in the range from 45 to 49 mm and even more preferably in the range from 46 to 48 mm; Δc/c is less than less than 0.1, preferably less than 0.09, more preferably less than 0.08, even more preferably less than 0.07, even more preferably less than 0.06, even more preferably less than 0.05, even more preferably less than 0.04 and even more preferably less than 0.03; $\tilde{h}(x)_{max}$ is in the range from 0.075 to 1.2 mm, preferably in the range from 0.1 to 0.75 mm and even more preferably in the range from 0.15 to 0.25 mm; the 75% quantile of the values that have been determined the term $$\sqrt{(dh/dx)^2+(dh/dy)^2}\times d1/h(x,y)_{delta}$$

is less than 4100 µm/mm, preferably less than 3900 µm/mm, more preferably less than 3700 µm/mm, even more preferably less than 3500 µm/mm, even more preferably less than 3300 µm/mm, even more preferably less than 3100 µm/mm, even more preferably less than 2900 µm/mm, even more preferably less than 2500 µm/mm and even more preferably less than 2000 µm/mm; $s2_{max}/s1\times(s2_{max}/s2_{min}-1)$ is less than 1.1, preferably less than 0.8 and even more preferably less than 0.5.

Glass

The glass of the container may be any type of glass and may consist of any material or combination of materials which the skilled person deems suitable in the context of the invention. Preferably, the glass is suitable for pharmaceutical packaging. Particularly preferable, the glass is of type I, more preferably type I b, in accordance with the definitions of glass types in section 3.2.1 of the European Pharmacopoeia, $7^{th}$ edition from 2011. Additionally, or alternatively preferable to the preceding, the glass is selected from the group consisting of a borosilicate glass, an aluminosilicate glass, soda lime glass and fused silica; or a combination of at least two thereof. For the use in this document, an aluminosilicate glass is a glass which has a content of $Al_2O_3$ of more than 8 wt.-%, preferably more than 9 wt.-%, particularly preferable in a range from 9 to 20 wt.-%, in each case based on the total weight of the glass. A preferred aluminosilicate glass has a content of $B_2O_3$ of less than 8 wt.-%, preferably at maximum 7 wt.-%, particularly preferably in a range from 0 to 7 wt.-%, in each case based on the total weight of the glass. For the use in this document, a borosilicate glass is a glass which has a content of $B_2O_3$ of at least 1 wt.-%, preferably at least 2 wt.-%, more preferably at least 3 wt.-%, more preferably at least 4 wt.-%, even more preferably at least 5 wt.-%, particularly preferable in a range from 5 to 15 wt.-%, in each case based on the total weight of the glass. A preferred borosilicate glass has a content of $Al_2O_3$ of less than 7.5 wt.-%, preferably less than 6.5 wt.-%, particularly preferably in a range from 0 to 5.5 wt.-%, in each case based on the total weight of the glass. In a further aspect, the borosilicate glass has a content of $Al_2O_3$ in a range from 3 to 7.5 wt.-%, preferably in a range from 4 to 6 wt.-%, in each case based on the total weight of the glass.

A glass which is further preferred according to the invention is essentially free from B. Therein, the wording "essentially free from B" refers to glasses which are free from B which has been added to the glass composition by purpose. This means that B may still be present as an impurity, but preferably at a proportion of not more than 0.1 wt.-%, more preferably not more than 0.05 wt.-%, in each case based on the weight of the glass.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Determination of Individual ĥ-Values

The distance between the outer surface of the circular glass bottom and the ground is determined by means of non-contact profilometer (cyberSCAN CT 300; cyberTECHNOLOGIES, Eching-Dietersheim, Germany) and a chromatic sensor (Precitec CHRocodile S 3000) using the ASCAN software. As shown in FIGS. 4A-4B, for the determination of the individual values for ĥ, for any given circle the centre of which corresponds to the centre of the glass bottom the distance h between contact plane representing the ground and the outer surface of the circular glass bottom is determined in regularly steps of 5° (i.e., 72 measuring points per circle), serving as data points for an azimuthal average. For a more precise measurement, the 72 single measuring points are defined as the moving average of additional measuring points (i.e., five additional measuring points are averaged to obtain a single measuring point) along the same circle. The first circle is a circle having a diameter of 500 μm and the radius increases for the following circles stepwise by 500 μm (which means that the radius of the second circle is 1,000 μm, the radius of the third circle is 1,500 μm and so on).

Fitting the Curvature Function ĥ(x) with the Individual ĥ-Values

In order to characterize the mean curvature of the glass bottom, the height function (I)

$$\hat{h}(x) = \frac{-c \times x^2}{1 + \sqrt{1 - c^2 \times x^2}} + h_0 \quad (I)$$

is fitted to at least four nodes $H_i(x_i)$ of the radial height profile using a common least square fitting, implemented in standard mathematical software packages, e.g. the "curve_fit" function of the open source scipy.optimize package:

https://docs.scipy.org/doc/scipy/reference/generated/scipy.optimize.curve_fit.html For the fit the variable parameters are c and $h_0$ are used. These variables are varied to obtain the minimum of $$f = \sum_{i=1}^{\infty} \left( H_i(x_i) - \hat{h}(x_i) \right)^2,$$

wherein standard deviation error (or fitting error) for constant c is referred to as "Δc". The standard deviation error is defined as $\Delta c = \sqrt{\sigma^2}$ ($\sigma^2$ being the variance).

The curvature c directly affects imaging through the glass bottom. The offset height $h_0$ depends on the reference system. In the case of referencing to the standing area, the offset height $h_0 \approx t$ (but only in rare cases equal).

Determination of the Slope at Position x,y and of the $h(x,y)_{max}$- and $h(x,y)_{min}$ Value The two-dimensional distance between the outer surface of the circular glass bottom and the ground is again determined by means of a non-contact profilometer (cyberSCAN CT 300; cyberTECHNOLOGIES, Eching-Dietersheim, Germany) and a chromatic sensor (Precitec CHRocodile S 3000). For the determination of the h(x,y)-values, the glass bottom is divided into an array of square parts 112 having an edge length of 200 μm as shown in FIG. 6A. At the centre of each of these square parts 112 the distance between the outer surface 106 of the glass bottom 104 and the ground is determined for individual measurement points 112 that are located in the centre of the square parts 112 as shown in FIG. 6A. From the thus obtained values h(x,y) only those values are selected that have been obtained for measurement points 135 that are located within a circle having a radius of 0.4×d2/2 (or a radius of 0.6×d2/2 or 0.8×d2/2) as shown in FIG. 6A.

From the thus obtained ĥ(x,y)-values the slope-values are calculated using an appropriate mathematical software, for example the "Slope Analysis" function of the Mx software version 8.0.0.3 (Zygo, part of AMETEK, Inc.). The slope magnitude can be calculated as $$\text{slope magnitude} = \sqrt{(dh/dx)^2 + (dh/dy)^2}.$$

For this calculation with the Mx software a slope lateral resolution as well as integration length of the edge length of the square parts 112 can be used, here 200 μm. The $h(x,y)_{max}$-value corresponds to the highest h(x,y)-value and the $h(x,y)_{min}$-value corresponds to the lowest h(x,y)-value that have been determined within the circle having a radius of 0.4×d2/2 (or a radius of 0.6×d2/2 or 0.8×d2/2).

Determination of Wavefront Distortion

A polar coordinate system is used to fit a continuous wavefront $W(\varrho, \varphi)$ to the measured nodes $W_i$. The wavefront is defined on the unit circle, thus ρ=1 corresponds to $$r = \sqrt[2]{x^2 + y^2} = A/2$$

With 2W<A<(2W+2 mm) and A being the measurement diameter of the Shack-Hartmann sensor. This continuous wavefront can again be expressed in Zernike terms by a superposition of Zernike polynomials (described by Thibos et al.: "*Standards for Reporting the Optical Aberrations of Eyes*"; Journal of Refractive Surgery; Vol. 18 (2002); pages S652-S660) as $$W(\varrho, \varphi) = \Sigma a_i Z_i.$$

Here the coefficients $a_i$ have been computed with the inner product $$a_i = \iint Z_i W(\varrho, \varphi) d\varrho\, d\varphi,$$

where $\varrho$ has been integrated from 0 to 1 and $\varphi$ from 0 to 2p. We define the corrected wavefront distortion $W(\varrho, \varphi)_{corrected}$ $$W(\varrho, \varphi)_{corrected} = W(\varrho, \varphi) - a_0 Z_0 - a_1 z_1 - a_2 Z_2 - a_4 Z_4$$

as the wavefront with piston ($Z_0$), tilt ($Z_1, Z_2$) and defocus ($Z_4$) subtracted. The OSA/ANSI indexing conventions as described in Thibos et al. are used. A setup to measure the wavefront distortion $W(\varrho, \varphi)$ is shown in FIG. 10.

Determination of $s2_{max}$ and $s2_{min}$

The measurement of the thickness of the circular glass bottom was performed using a CHRocodile M4 high resolution measuring head (Precitec GmbH & Co. KG, Lemgo, Germany) with a measuring range of 200-3000 µm and a resolution of 0.1 µm. A step width of 0.1 mm was selected laterally.

Wall Thicknesses and Diameters

The wall thickness s1 of the glass container at a given position as well as the outer diameter (d1) of the glass container at a given position are determined in accordance with DIN ISO 8362-1:2016-06. The inner diameter (d2) can be calculated from s1 and d1.

EXAMPLE

A glass tube (Fiolax® clear, Schott AG, Germany) having an outer diameter d1 of 30 mm and a wall thickness s1 of 1.1 mm is loaded into the head of a rotary machine. While rotating around its major axis the glass tube is heated to its softening point with two separation gas burners as shown in FIGS. 8A-8D and the heated glass is pulled along its major axis by moving downwards the lower clamping chucks for stretching and creating a container closure in the form of a circular glass bottom. When moving downwards the lower clamping chucks, the separation gas burners are moved in the same direction as the lower clamping chucks. The ratio of the distance with which the separation gas burners have been moved downwards to the distance with which the lower clamping chucks have been moved downwards ($|Y'_{stop} - Y'_0|/|Y_{stop} - Y_0|$; see FIG. 9) was 0.72. Furthermore, the burner was moved downwards with a time offset ($\Delta t$) of 0.085 sec. In a Comparative Example representing the prior-art process the burner remains at a fixed position when the lower clamping chucks are moved downwards. The glass containers prepared as described above are characterized by a volume of 20 ml.

| | Inventive Example | Comparative Example |
|---|---|---|
| $\Delta c/c$ | 0.034 | 0.27 |
| peak to valley difference $(W(\varrho, \varphi)_{corrected})_{max} - (W(\varrho, \varphi)_{corrected})_{min}$ | 31 waves | 148 waves |
| 75% quantile for the term $\sqrt{(dh/dx)^2 + (dh/dy)^2} \times d1/h(x, y)_{delta}$ | 3300 µm/mm | 4130 µm/mm |
| $s2_{max}$ | 1.36 mm | 1.55 mm |
| $s2_{min}$ | 1.27 mm | 0.87 mm |
| $s2_{max}/s1 \times (s2_{max}/s2_{min} - 1)$ | 0.088 | 1.101 |

-continued

| | Inventive Example | Comparative Example |
|---|---|---|
| optical inspection capability | see FIG. 11C on the right | see FIG. 11C on the left |

As can be seen, adjusting the outer contour of the circular glass bottom in order to ensure that the relative standard deviation error $\Delta c/c$ is below 0.1 significantly improves the optical inspection capability of the glass container.

DETAILED DESCRIPTION

Figure 1:
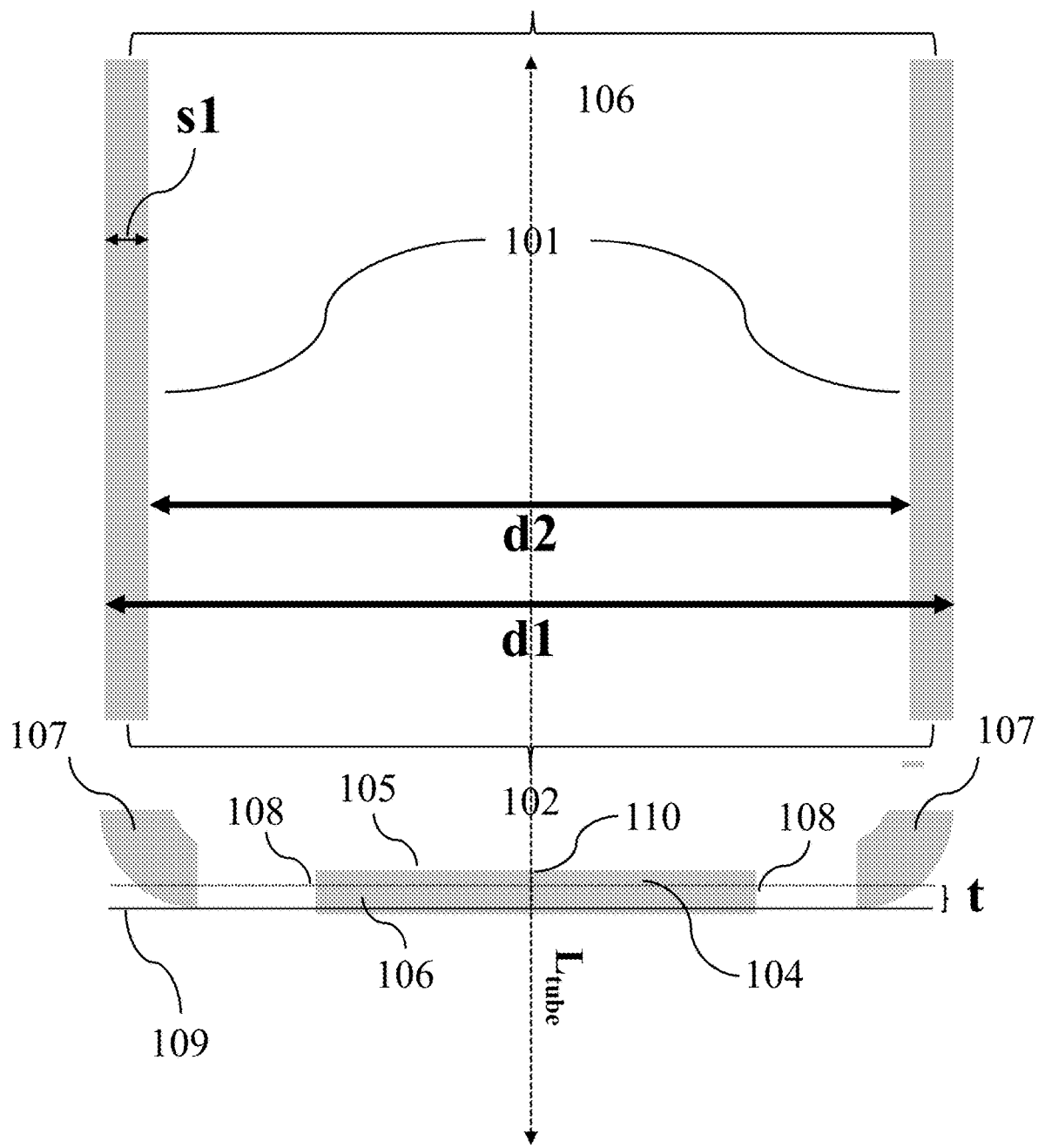
FIG. 1 shows a cross-sectional view of a glass container according to the invention, wherein for the purpose of an improved illustration the parts of the glass container (i.e., glass tube 101, glass bottom 104 and curved glass heel 107) have been separated from each other.
Figure 2:
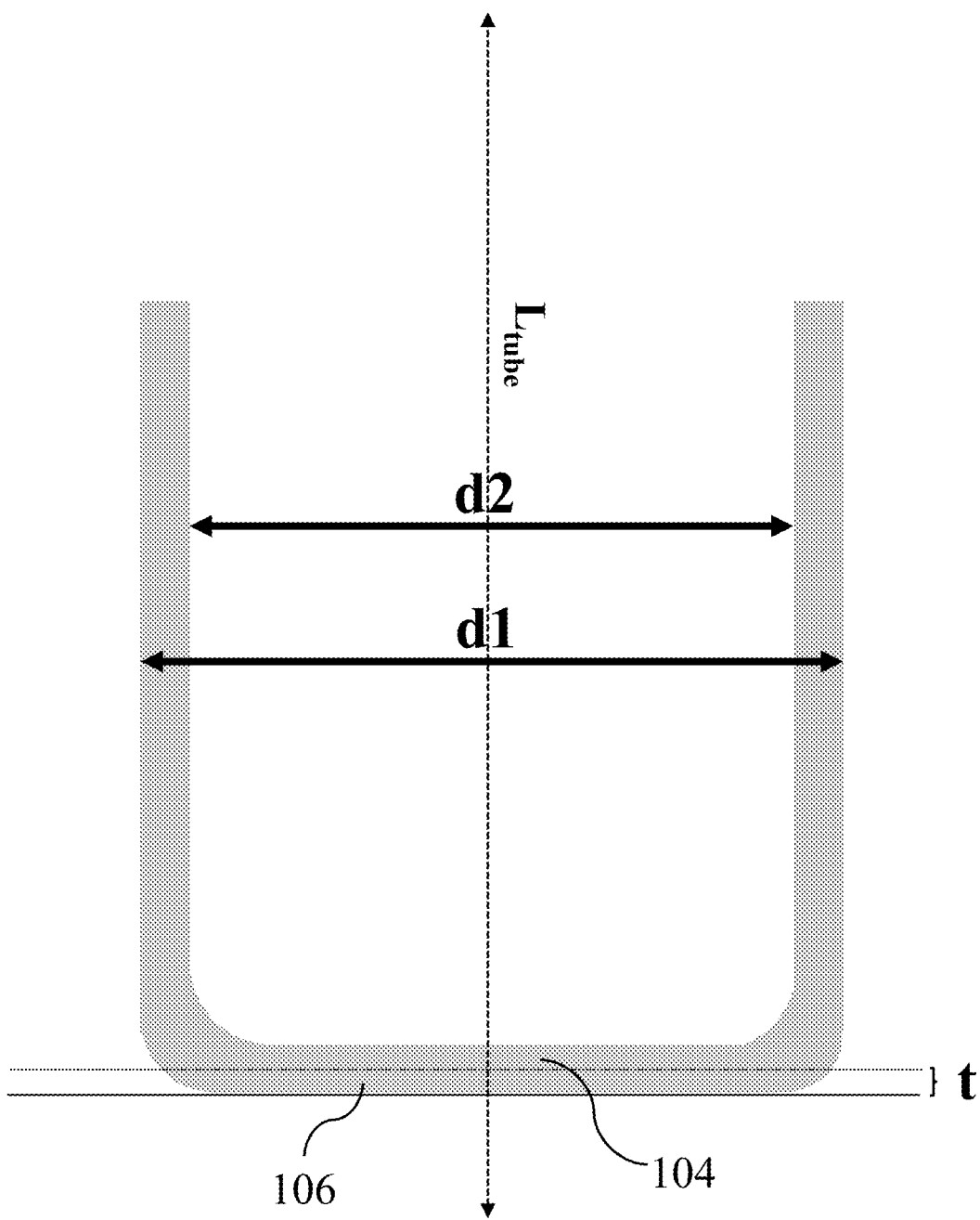
FIG. 2 shows a cross-sectional view of a glass container 100 according to the invention in which the individual container parts shown in FIG. 1 (i.e., glass tube 101, glass bottom 104 and curved glass heel 105) are arranged in the usual way.

FIG. 1 shows a cross-sectional view of a glass container according to the invention, wherein for the purpose of an improved illustration the parts of the glass container (i.e., glass tube 101, glass bottom 104 and curved glass heel 107) have been separated from each other. The glass container 100 comprises a glass tube 101 with a first end 102 and a further end 103, the glass tube 101 having an outer diameter d1, an inner diameter d2 and a wall thickness s1. The glass tube 101 is further characterized by a longitudinal axis $L_{tube}$ that passes through the centre of the first end 102 and the further end 103. The glass tube further comprises a circular glass bottom 104, wherein the circular glass bottom 104 closes the glass tube 101 at the first end 102, wherein the circular glass bottom 104 comprises an inner surface 105 directed to the inside of the glass container 100, an outer surface 106 directed to the outside of the glass container 100 and a centre 110. The glass container further comprises a curved glass heel 107 extending from an outer end 108 of the circular glass bottom 104 to the first end 102 of the glass tube 101. As can also be seen in FIG. 1, the glass bottom is preferably characterized by a bottom indentation t which usually takes on the maximum value in the centre 110 of the circular glass bottom 104. FIG. 2 shows a glass container 100 in which the individual container parts shown in FIG. 1 (i.e., glass tube 101, glass bottom 104 and curved glass heel 107) are arranged in the usual way.

Figure 3A:
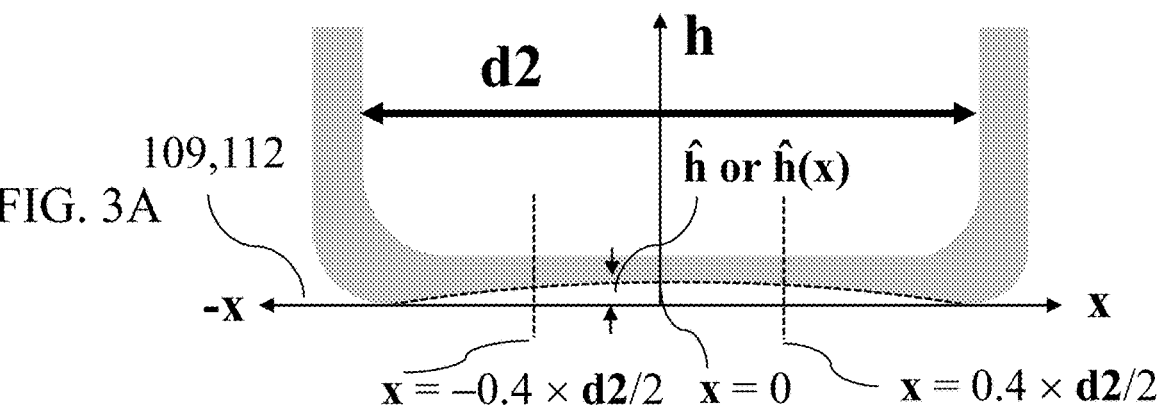
FIGS. 3A-C show a cross-sectional view of the bottom area of a glass container 100 according to the invention and illustrate the different areas in which individual values for $\hat{h}$ or $\hat{h}(x)$ can be determined.
Figure 3B:
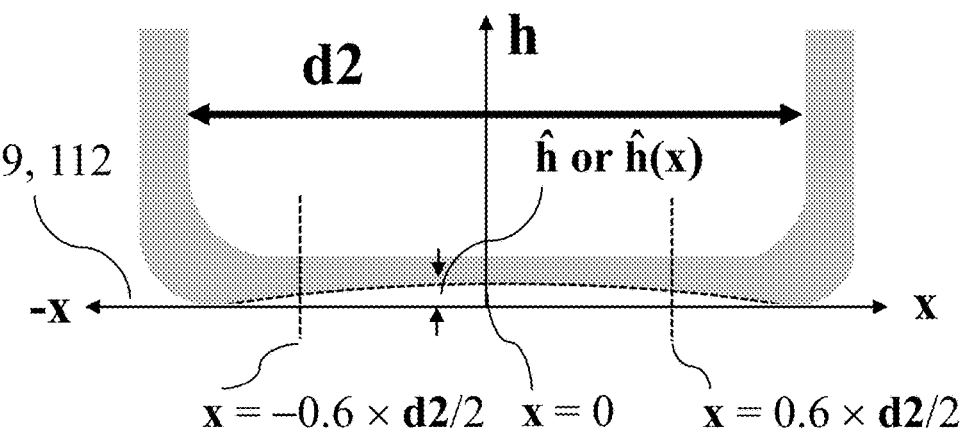
Figure 3C:
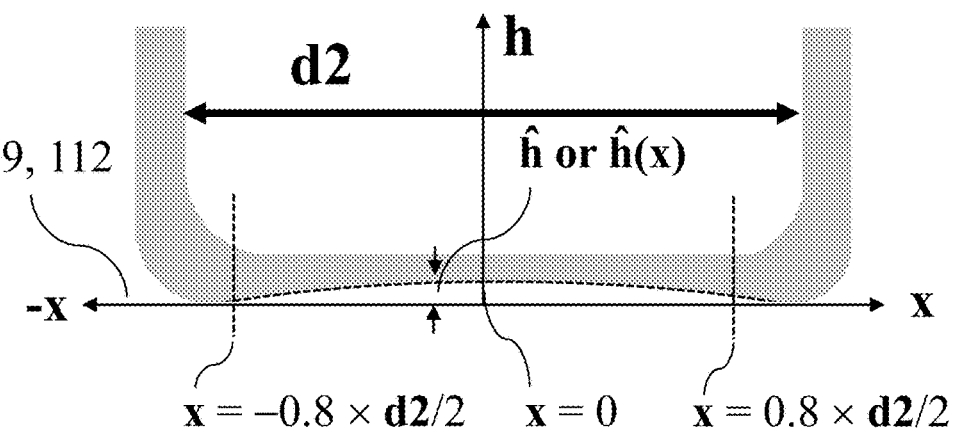

FIGS. 3A-3C show a cross-sectional view of the bottom area of a glass container 100 according to the invention and illustrate the different areas (x±0.4×d2/2 in FIG. 3A, x±0.6×d2/2 in FIG. 3B and x±0.8×d2/2 in FIG. 3C) in which the distance h between a contact plane 109 and the outer surface 106 of the circular glass bottom 104 at a given position x, with x=0 in the centre 110 of the circular glass bottom 104, is determined. The individual values of h can be applied to determine $\hat{h}$ and $\hat{h}(x)$.

Figure 4A:
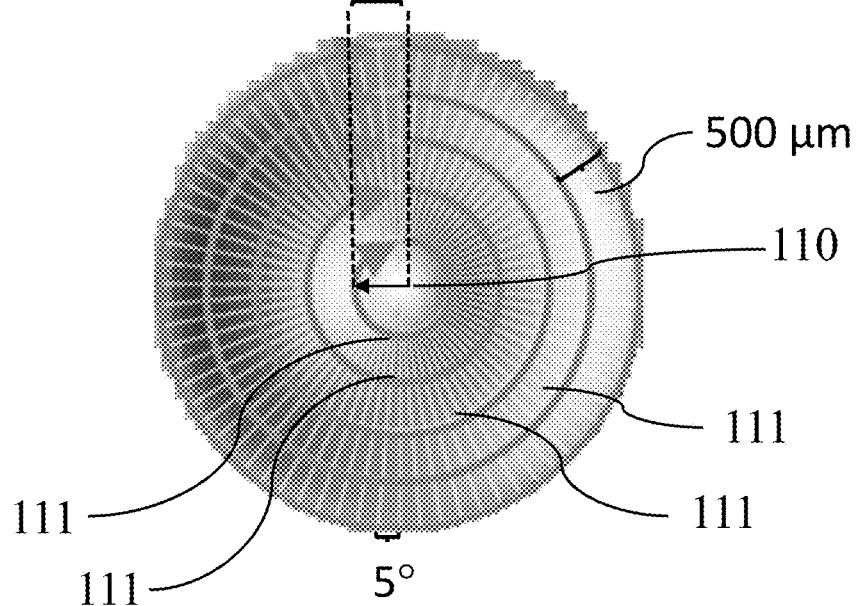
FIGS. 4A-B show the arrangement of concentrical circles 111 along which the individual values for $\hat{h}$ are determined (FIG. 4A) and the way in which the azimuthal average for $\hat{h}$ is obtained for a given circle 111 (FIG. 4B)
Figure 4B:
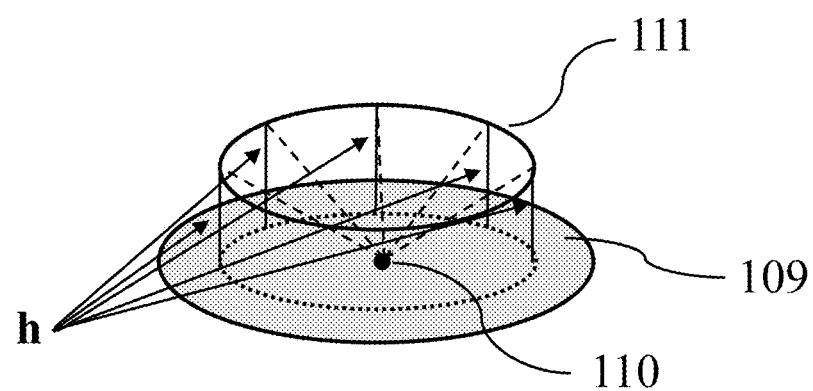

FIG. 4A shows the arrangement of concentrical circles 111 along which the individual values for $\hat{h}$ are determined. As shown in FIG. 4B, for the determination of the individual values for $\hat{h}$, for any given circle the distance h between contact plane 109 representing the ground on which the glass container 100 rests and the outer surface 106 of the circular glass bottom 104 is determined in regularly steps of 5° (i.e., 72 measuring points per circle; for the sake of clarity only 5 steps are shown in FIG. 4B), serving as data points for an azimuthal average. The first circle 111 is a circle having a diameter of 500 μm and the radius increases for the following circles stepwise by 500 μm (which means that the radius of the second circle is 1,000 μm, the radius of the third circle is 1,500 μm and so on).

Figure 5:
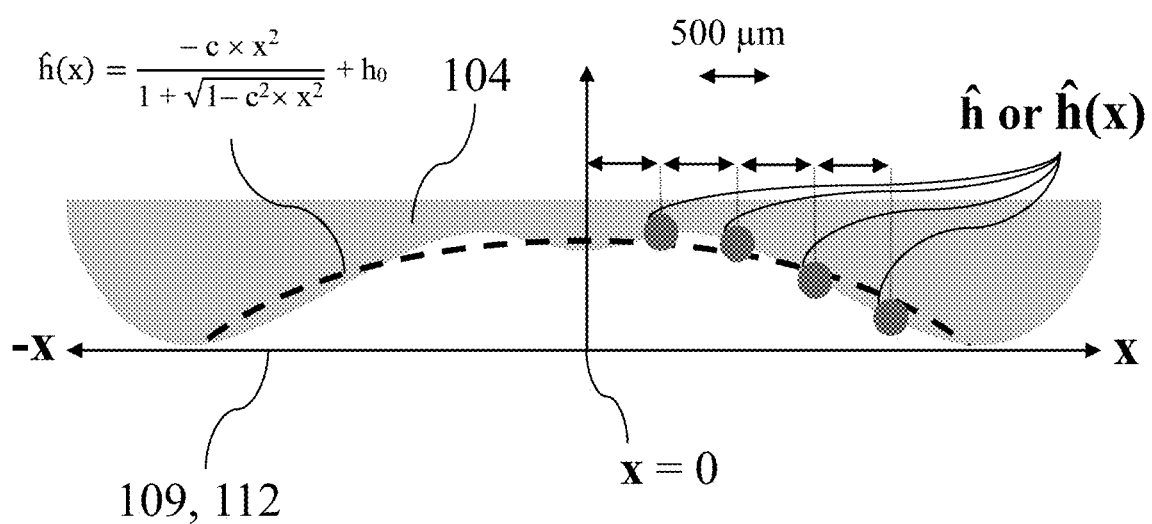
FIG. 5 shows a graph of the individual values for $\hat{h}$ that have been determined for a given circular glass bottom 104 and the fitted function $\hat{h}(x)$ (dashed line)

From the thus obtained values for h the azimuthal average corresponds to the individual value $\hat{h}$ that has been determined for any given circle 111. FIG. 5 shows a graph of the individual values for fa that have been determined for a given circular glass bottom 104 and the fitted function $\hat{h}(x)$ (see the dashed line). The fitted function is represented by formula (I)

$$\hat{h}(x) = \frac{-c \times x^2}{1 + \sqrt{1 - c^2 \times x^2}} + h_0 \tag{I}$$

in which c and $h_0$ serve as individual fitting parameters. The above function is the curvature function of a sphere having the radius R with c=1/R. Values for c (and also for the standard deviation error (Δc) indicating how exactly the determined individual values of $\hat{h}$ can be reproduced using the curvature function given above) are determined using an appropriate mathematical software (ASCAN-Software) as described in the "Test method"-section above.

Figure 6A:
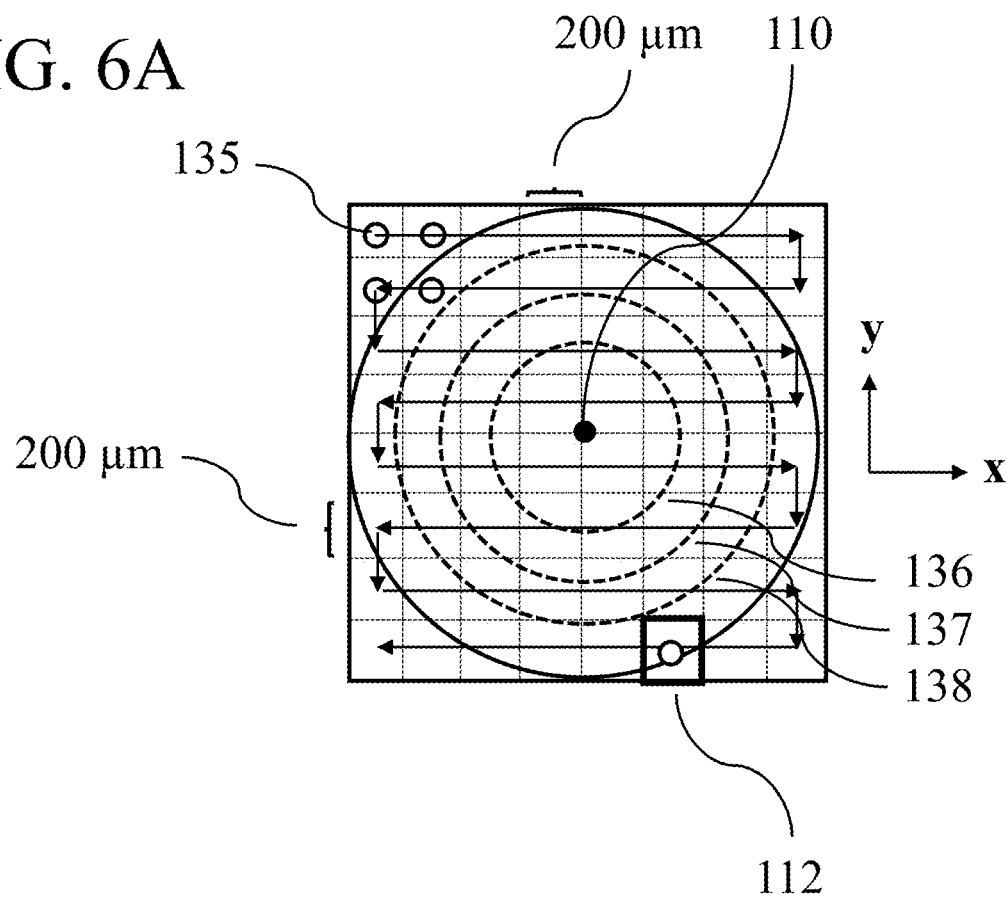
FIGS. 6A-6B show the experimental setup that has been used to determine the two-dimensional distance h(x,y) and the slope magnitude of the outer surface of the glass bottom at a given position x,y.
Figure 6B:
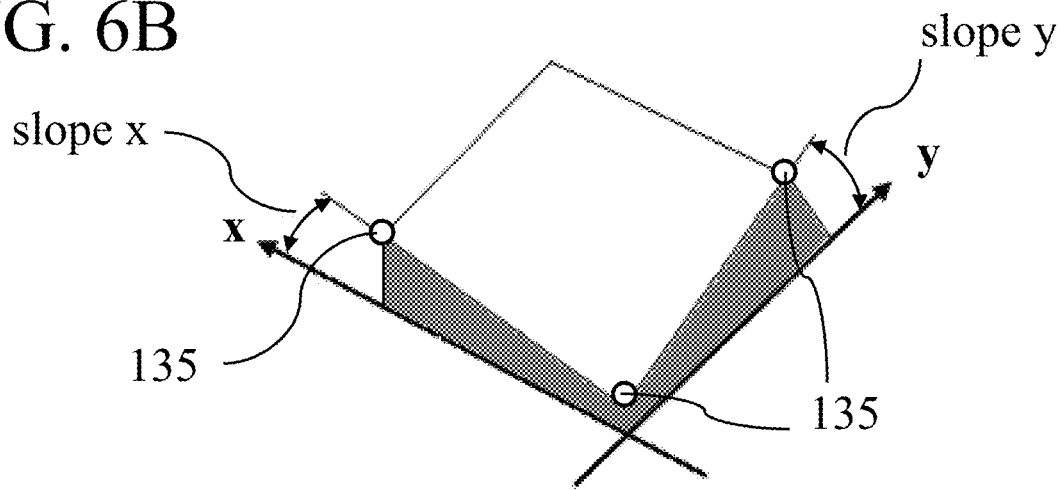

FIGS. 6A and 6B show the experimental setup that has been used to determine the two-dimensional distance $\hat{h}(x,y)$ and the slope magnitude $$\sqrt{(dh/dx)^2 + (dh/dy)^2}$$

of the outer surface 106 of the glass bottom 104 at a given position x,y. The distance h(x,y) between the outer surface 106 of the circular glass bottom 104 and the ground at a given position x,y is determined by means of a non-contact profilometer. For the determination of the individual values of the two-dimensional distance h(x,y), the glass bottom 104 is divided into an array of square parts 112 having an edge length of 200 μm. At the centre of each of these square parts 112 the distance between the outer surface 106 of the glass bottom 104 and the ground is determined at measurement point 135 as shown in FIG. 6A (the individual measurement points 135 are evaluated in an order following the arrows shown in FIG. 6A) and addressed to the corresponding x and y values of the respective square and stored as an individual value of h(x,y). From the thus obtained values for the two-dimensional distance h(x,y) only those values are selected for calculating the slope magnitude and for determining $h(x,y)_{max}$ and $h(x,y)_{min}$ that have been obtained for measurement points 135 that are located within a circular area 136 having a radius of 0.4×d2/2 (or within a circular area 137 having a radius of 0.6×d2/2 or within a circular area 138 having 0.8×d2/2) as shown in FIG. 6A.

From the thus obtained $\hat{h}(x,y)$-values the slope magnitude representing the slope of between measurement points for different x and y, preferably between neighboring measurement points, is calculated using an appropriate mathematical software, for example the "Slope Analysis" function of the Mx software.

The $h(x,y)_{max}$-value corresponds to the highest $h(x,y)$-value and the $h(x,y)_{min}$-value corresponds to the lowest $h(x,y)$-value that have been determined within the circular area 136 having a radius of 0.4×d2/2 (or within the circular area 137 having a radius of 0.6×d2/2 or within the circular area 138 having a radius of 0.8×d2/2).

Figure 7A:
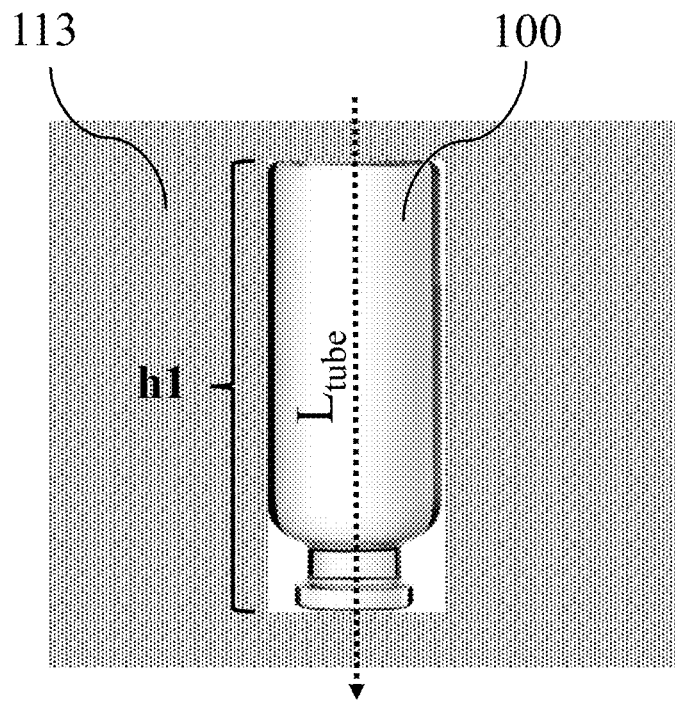
FIGS. 7A-7B show in a side view the localization of plane 113 that is used to determine $s2_{max}$ and $s2_{min}$ in the circular glass bottom 104 of the glass container 100 (FIG. 7A) and the localization of $s2_{max}$ and $s2_{min}$ as well as the width of the area within which these values are to be determined in an exemplary bottom cross-section (FIG. 7B)
Figure 7B:
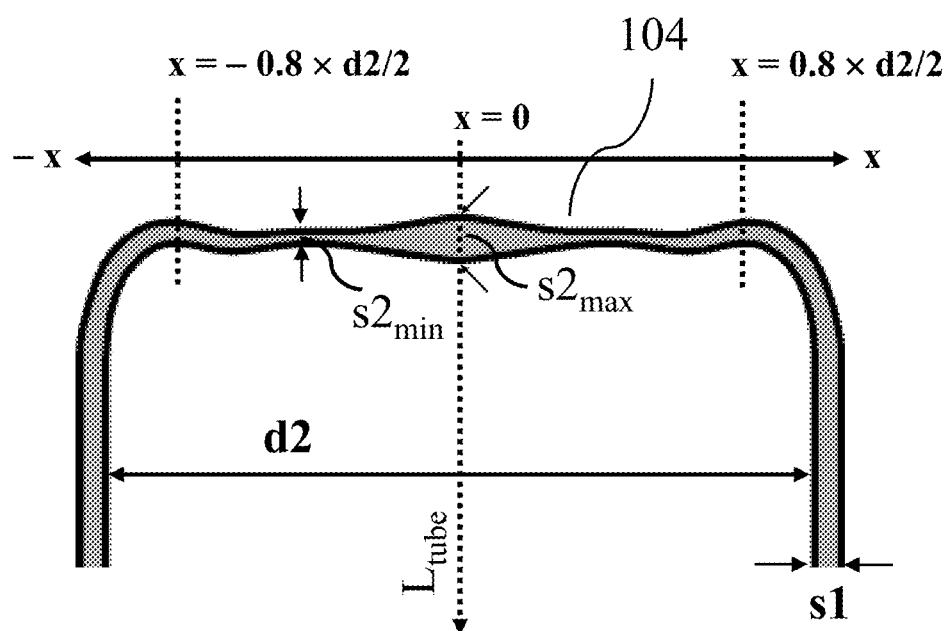
Figure 8A:
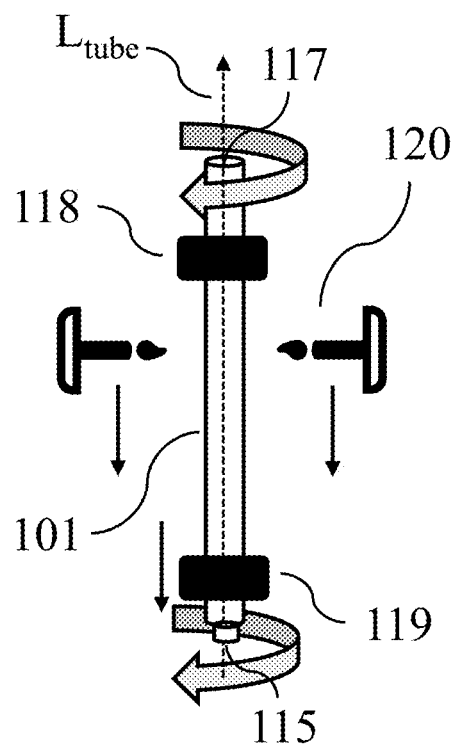
FIGS. 8A-8D show the process for the preparation of a glass container 100 according to the present invention.
Figure 8B:
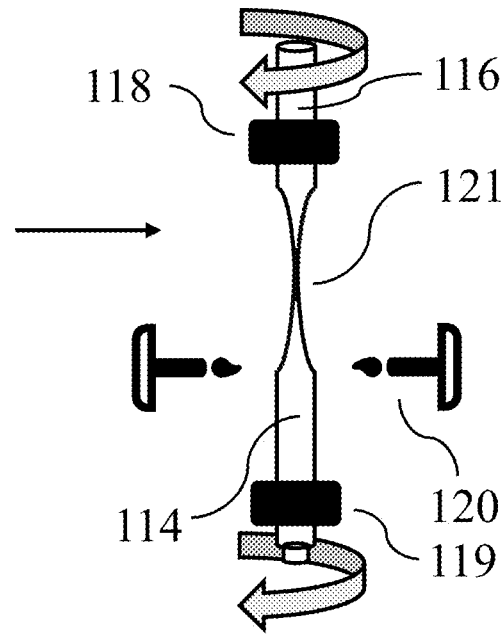
Figure 8D:
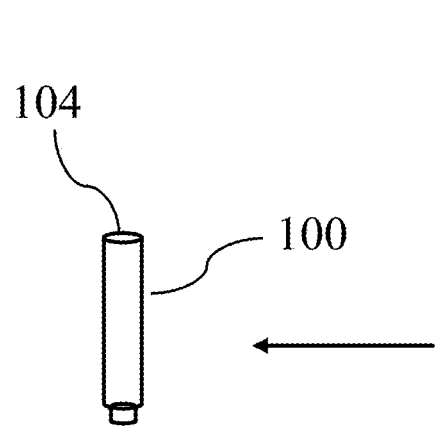
Figure 8C:
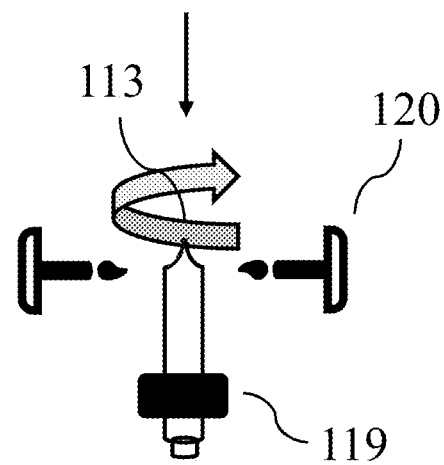

FIG. 7A shows in a side view the localization of plane 113 that is used to determine $s2_{max}$ and $s2_{min}$ in the bottom 104 of the glass container 100. Plane 113 corresponds to the plane that is centrically located in the glass container 100 and that comprises the longitudinal axis $L_{tube}$ of the glass container 100 (indicated by the dashed line in FIG. 7A), i.e., the axis that goes perpendicular through the centre 110 of the bottom 104 (see FIG. 7B). FIG. 7B shows the localization of $s2_{max}$ and $s2_{min}$ as well as the width of the area within which these values are to be determined in an exemplary bottom cross-section. As can be seen, $s2_{max}$ and $s2_{min}$ are determined within an area that extends over about 65% of the area of the circular glass bottom, wherein the centre of this area is located in the centre 110 of the circular glass bottom 104.

FIGS. 8A-D show the process for the preparation of a glass container 100 that displays a glass bottom as define herein. In a first process step I) the glass tube 101 having an upper portion 116 with an upper end 117 and a lower portion 114 with a lower end 115 is held by means of upper and lower clamping chucks 118,119 in a vertical position. The glass tube 101 is heated at a defined position between the lower and the upper portion 114,116 by means of two opposed separation gas burners 120 to a temperature above the glass transition temperature while the glass tube 101 is rotating around its longitudinal axis $L_{tube}$ (see FIG. 8A). In process step II) the lower portion 114 of the glass tube 101 is pulled downwards by moving downwards the lower clamping chucks 119 while the glass tube 101 is rotating around its longitudinal axis $L_{tube}$ (see FIG. 8B). When moving downwards the lower clamping chucks 119 and thus also the lower portion 114 of the glass tube 101, a glass thread 121 is formed (see also FIG. 8B). When further moving downwards the lower portion 114, this portion is separated from the upper portion 116 by pulling apart the glass thread 121, the part of the mass of the glass thread 121 that remains at the lower portion 114 of the glass tube 101 forming a circular bottom 104 (see FIGS. 8C and 8D). The process for the preparation of a glass container according to the present invention is characterized in that, while pulling downwards the lower portion 114, the at least one separation gas burner 120 does not remain at the same position as it is observed in the process known from the prior art, but is moved downwards in a direction that is substantially parallel to the direction in which the lower clamping chucks 119 are moved downwards (indicated by the arrows beneath the separation gas burners 120 in FIG. 8A), the at least one separation gas burner 120 thereby following the upper end 122 of the lower portion 114.

Figure 9:
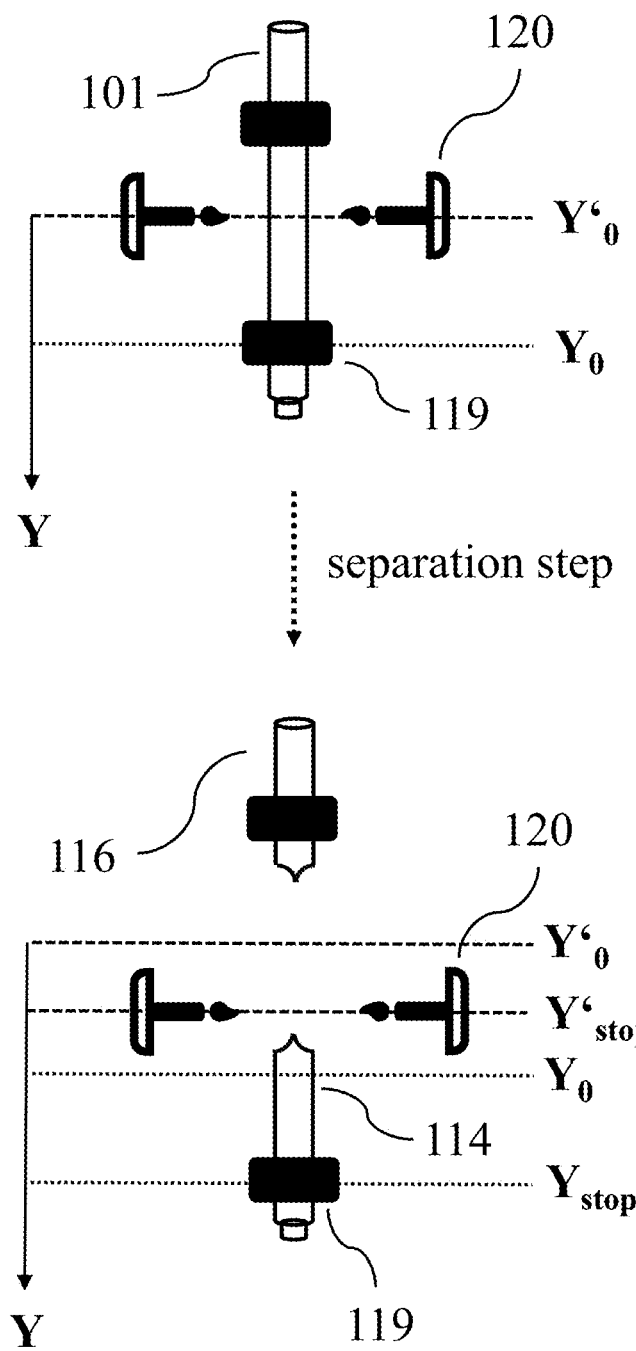
FIG. 9 shows the movement of the separation gas burners 120 and the lower clamping chucks 119 at the time at which the lower clamping chucks 119 are moved downwards.

FIG. 9 shows the movement of the separation gas burners 120 and the lower clamping chucks 119 at the time at which the lower clamping chucks 119 are moved downwards. In the embodiment of the process shown in FIG. 9, the lower clamping chucks 119 are moved downwards at a point of time t and the at least one separation gas burner 120 is moved downwards at a point of time $t'=t+\Delta t$, wherein $\Delta t$ can be zero (which means that the lower clamping chucks 119 and the at least one separation gas burner 120 are moved downwards simultaneously) or $\Delta t$ can be larger than zero. In this case the at least one separation gas burner 120 is moved downwards with a time delay in relation to the lower clamping chucks 119. As can also be seen in the embodiment of the process shown in FIG. 9, the at least one separation gas burner 120 is moved downwards starting from a position $Y'_0$ to a position $Y'_{stop}$ and the lower clamping chucks 119 start from a position $Y_0$ and, preferably after the at least one separation gas burner 120 has stopped at position $Y'_{stop}$, to stop at a position $Y_{stop}$, wherein $|Y'_{stop}-Y'_0|<|Y_{stop}-Y_0|$. According to this embodiment it is thus preferred that the distance with which the at least one separation gas burner 120 is moved downwards is smaller than the distance with which the lower clamping chucks 119 are moved downward.

Figure 10:
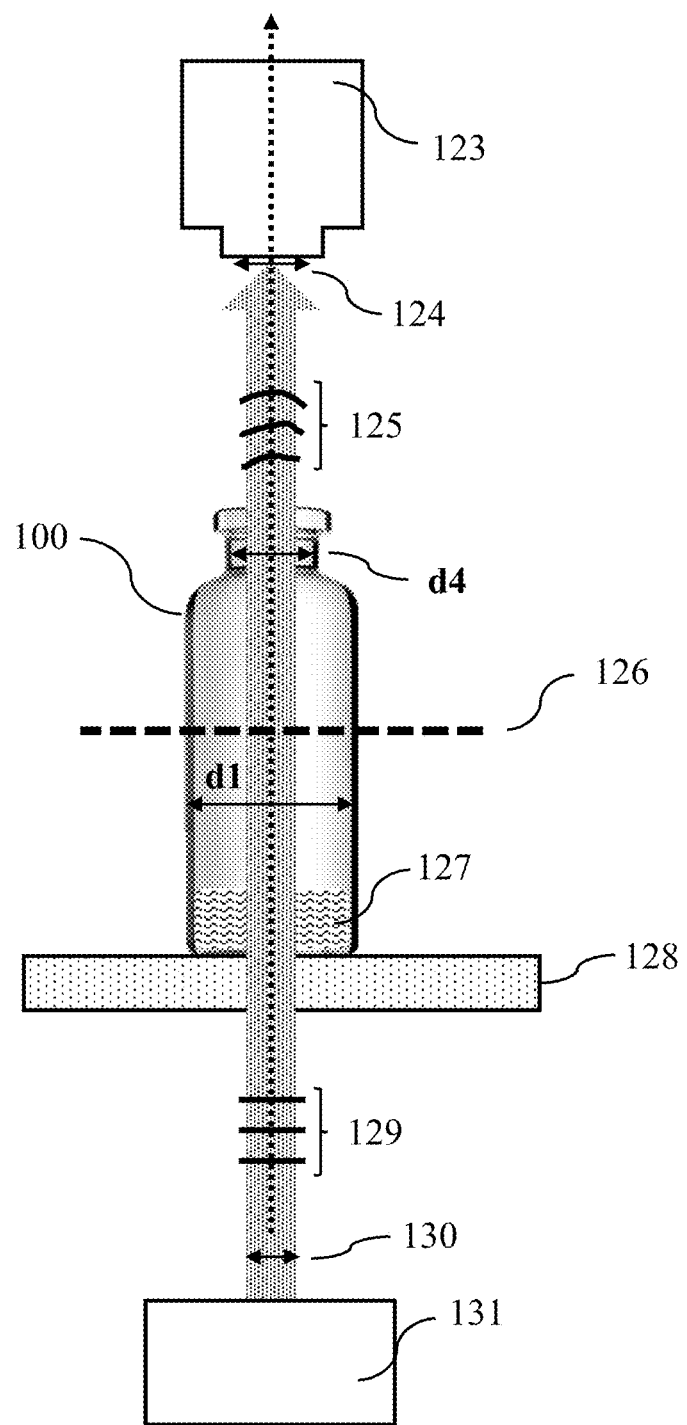
FIG. 10 shows the experimental set up for the characterization of wavefront distortions caused by the outer contour of the circular glass bottom 104.

FIG. 10 shows the experimental setup to characterize wavefront distortions caused by the outer shape of the glass bottom 104 of a glass container 100 (which in FIG. 10 is a vial), independent of the imaging system eventually used for the inspection. A collimated laser beam 130 of $1/e^2$ diameter (2W=3 mm) and wavelength of 520 nm from a laser source 132 (e.g. Thorlabs PL201, in order to cover 70% of $d_2$ for vial with $d_2$=13 mm it has been extended to 2W=9 mm with the Beamexpander Thorlabs GBE01-A) is directed towards the glass bottom 104 of a vial 100 standing on a transparent support 128. Since the inspection is usually carried out with a filled vial 100, the vial 100 is filled with water 127 up to a height that completely covers the inner surface 105 of the glass bottom 104. Practically this can be achieved with a fill height of 10 mm. The effect of the inner surface 105 of the glass bottom 104 on the optical imaging can be neglected since $n_{vial}-n_{filling}\approx 0.01<n_{vial}-n_{air}\approx 0.5$, thus the inner surface 105 of the glass bottom 104 has a much smaller effect on the wavefront. However, in this measurement it is intended to completely eliminate the influence of the inner surface 105 of the glass bottom 104 and for that purpose an index-matching liquid of $n=n_{vial}$ is selected. One crucial factor of the measurement is the inner neck diameter d4 of the vial 100. In order to characterize the wavefront distortion for a laser diameter that is larger diameter than $d_4$, the top region of the vial 100 is removed along a cutting plane 126. Thus, if no further imaging optic (e. g. another beam expander used in reverse) is used, the measurement aperture 124 of the Shack-Hartmann sensor 123 determines the diameter of the wavefront measurement. For the experimental set up used herein a Shack-Hartmann sensor 123 with a large aperture 124 of 11.26 mm×11.26 mm has been used (WFS40-7AR, Thorlabs Inc.). Thus, in this setup it would be necessary to shrink the beam size with another beam expander, if vials with $d_2$ larger than 13 mm are investigated.

The Shack-Hartmann sensor 123 contains an array microlenses 133 that images a characteristic dot pattern onto a CCD. For a planar wavefront 129, the dot pattern has the same spacing as the spacing of the micro-lens array. However, if the wavefront is aberrated when passing through the glass bottom to obtain the aberrated wavefront 125, any aberrations locally displace the dot laterally in the direction of the distortion (as shown in FIG. 3 of the publication "History and Principles of Shack-Hartmann Wavefront Sensing"; Ben C. Platt and Roland Shack; Journal of Refractive Surgery; Vol. 17 (2001), pages S573-S577). This way, the distortion can be mapped onto the nodes W, the micro-lens array the Shack-Hartmann-Sensor 123 provides.

Figure 11A:
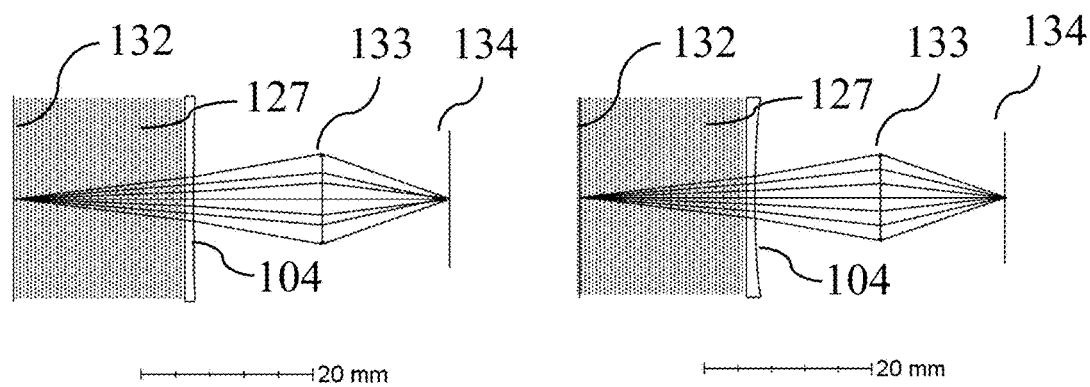
FIGS. 11A-C show the simulation results for the passage of an image through a distorted glass bottom 104.
Figure 11B:
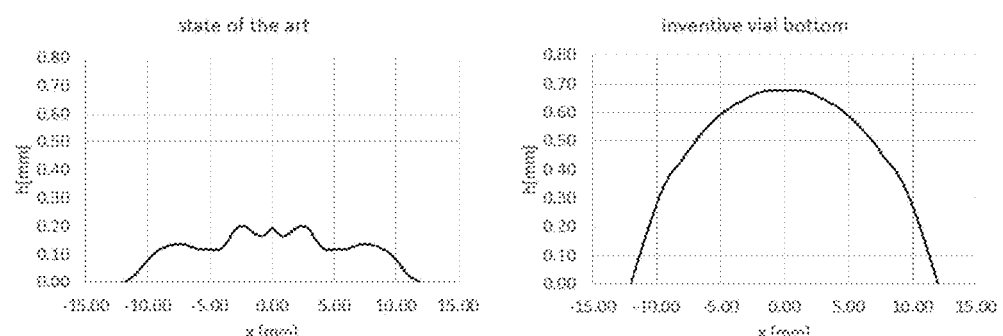
Figure 11C:
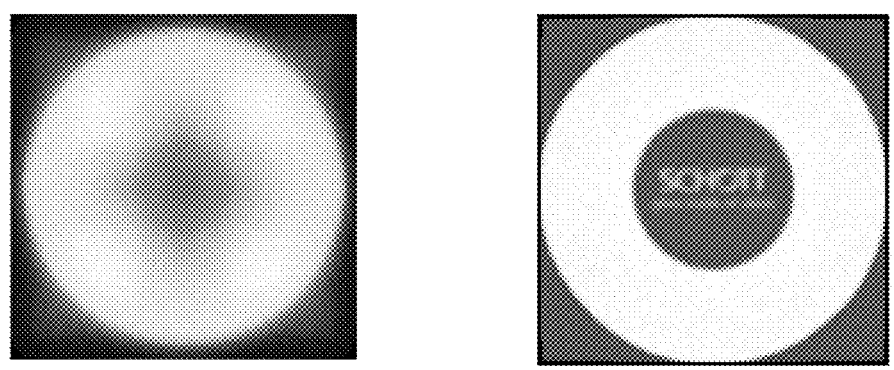

FIGS. 11 A-C show the simulation results for the passage of an image through a distorted glass bottom 104. The form of the glass bottom 104 follows real measurements, which were obtained by measuring and averaging the height at several 500 μm spaced rings and fitting a spline function through all radial nodes (FIG. 11B, wherein the figure on the left represents the outer contour of a state-of-the-art glass bottom 104 and the figure on the right represents the outer contour of a glass bottom 104 in a glass container according to the present invention). An ideal objective of NA 0.5 is assumed for the vial 100 (filled with 20 mm of water). The effect of the inner surface 105 of the vial bottom 104 has been neglected. While the optical power caused by the curvature of the vial bottom can be easily corrected by shifting the image plane (so called defocus correction), higher order aberrations cannot: The state-of-the-art glass bottom 104 significantly distorts the image and even after defocus correction, the image at the image plane 134 remains blurred due to spherical aberrations (see the figure on the left of FIG. 11C). The glass bottom 104 in the glass container 104 according to the present invention is less flat, but with significant lower radial variation. The image itself after defocus correction is only slightly perturbed (see FIG. 11C on the right) and is suitable for analysis, e.g. particle detection.

LIST OF REFERENCE NUMERALS 100 glass container
101 glass tube
102 first end of the glass tube 101
103 second end of the glass tube 101
104 circular glass bottom
105 inner surface of the circular glass bottom 104
106 outer surface of the circular glass bottom 104
107 curved glass heel
108 outer end of the circular glass bottom
109 contact plane representing the ground
110 centre of the glass bottom 104 or the circle 111
111 circle
112 square in the centre of which h(x,y) is determined
113 cut surface
114 first or lower portion of the glass tube 101
115 first or lower end of the first or lower portion 114
116 second or upper portion of the glass tube 101
117 second or upper end of the second or upper portion 116
118 first or upper clamping chucks 119 second or lower clamping chucks
120 separation gas burner
121 glass thread
122 upper end of portion 114,116, preferably of lower portion 114
123 Shark-Hartmann-sensor
124 aperture for measuring range of the Shark-Hartmann-sensor 123
125 wavefront aberrated by the circular glass bottom 104
126 cutting plane if top region has to be removed for measurement
127 $H_2O$ (filling height: 10 mm)
128 transparent support
129 undisturbed wavefront
130 collimated laser beam (width: $1/e^2$ at 2W)
131 laser source (520 nm)
132 plane of object
133 lens (NA 0.5)
134 plane of image
135 measurement point
136 circular area having a radius of $0.4 \times d2/2$
137 circular area having a radius of $0.6 \times d2/2$
138 circular area having a radius of $0.8 \times d2/2$

The invention claimed is:

1. A glass container, comprising:
a glass tube with a first end, a second end, an outer diameter (d1), an inner diameter (d2), and a glass thickness (s1);
a circular glass bottom that closes the glass tube at the first end, wherein the circular glass bottom comprises an inner surface directed to an inside of the glass tube and an outer surface directed to an outside of the glass tube;
a longitudinal axis ($L_{tube}$) that passes through a centre of the glass tube and the circular glass bottom; and
a curved glass heel extending from an outer end of the circular glass bottom to the first end of the glass tube;
wherein the outer surface of the circular glass bottom has a topography defined by a function $\hat{h}(x)$,
wherein $\hat{h}(x)$ is an azimuthal average of a distance between a contact plane and the outer surface at any given position that is located on a circle having a center that corresponds to the centre of the circular glass bottom and the radius |x|,
wherein the contact plane is the plane on which the glass tube rests,
wherein individual values $\hat{h}$ for $\hat{h}(x)$ are determined for a plurality of circles the radius of which increases stepwise by 500 µm, starting with a circle around the center having a radius of 500 µm,
wherein the individual values $\hat{h}$ are determined in a range from $x=-0.4 \times d2/2$ to $x=+0.4 \times d2/2$, d2 having a size such that at least 4 values $\hat{h}$ are determined,
wherein the individual values $\hat{h}$ can be fitted in a least square fit with a curvature function $$\hat{h}(x) = \frac{-c \times x^2}{1 + \sqrt{1 - c^2 \times x^2}} + h_0$$

wherein c and $h_0$ are free fitting parameters, and
wherein $\Delta c$ is the standard deviation error for constant c when fitting the individual values $\hat{h}(x)$ with the curvature function and wherein the relative standard deviation error $\Delta c/c$ is less than 0.1.

2. The glass container of claim 1, wherein the relative standard deviation error $\Delta c/c$ is less than 0.08.

3. The glass container of claim 1, wherein the relative standard deviation error $\Delta c/c$ is less than 0.04.

4. The glass container of claim 1, wherein the individual values $\hat{h}$ have been determined in a range from $x=-0.6 \times d2/2$ to $x=+0.6 \times d2/2$ and the relative standard deviation error $\Delta c/c$ is less than 0.1.

5. The glass container of claim 4, wherein the relative standard deviation error $\Delta c/c$ is less than 0.08.

6. The glass container of claim 4, wherein the relative standard deviation error $\Delta c/c$ is less than 0.04.

7. The glass container of claim 1, wherein the individual values $\hat{h}$ have been determined in a range from $x=-0.8 \times d2/2$ to $x=+0.8 \times d2/2$ the relative standard deviation error $\Delta c/c$ is less than 0.1.

8. The glass container of claim 7, wherein the relative standard deviation error $\Delta c/c$ is less than 0.08.

9. The glass container of claim 7, wherein the relative standard deviation error $\Delta c/c$ is less than 0.04.

10. The glass container of claim 1, wherein for a wavefront distortion $W(\varrho,\varphi)$ of a laser light with a wave length of 520 nm, a beam width of at least $0.6 \times d2$ and less than $0.85 \times d2$, that passes through the circular glass bottom in a direction from the outer surface to the inner surface, that is aligned collinear with the longitudinal axis ($L_{tube}$), and that has been corrected for piston, tilt and defocus, a peak to valley difference $$(W(\varrho,\varphi)_{corrected})_{max} - (W(\varrho,\varphi)_{corrected})_{min}$$

is less than 100 waves.

11. The glass container of claim 10, wherein the peak to valley difference is less than 40 waves.

12. The glass container of claim 1, wherein for a wavefront distortion $W(\varrho,\varphi)$ of a laser light with a wave length of 520 nm, a beam width of at least $0.6 \times d2$ and less than $0.85 \times d2$, that passes through the circular glass bottom in a direction from the outer surface to the inner surface, that is aligned collinear with the longitudinal axis ($L_{tube}$), and that has been corrected for piston and tilt, the corrected wavefront distortion is point symmetric and wherein for a fixed set of radii $\varrho_0=\frac{1}{4}$, $\varrho_0=\frac{1}{2}$ and $\varrho_0=1$, a azimuthal peak to valley difference $$(W(\varrho_0,\varphi)_{corrected})_{max} - (W(\varrho_0,\varphi)_{corrected})_{min}$$

is less than 100 waves.

13. The glass container of claim 12, wherein the azimuthal peak to valley difference is less than 40 waves.

14. The glass container of claim 1, wherein the two-dimensional distance is measured in a direction that is parallel to the longitudinal axis ($L_{tube}$),
wherein $$\sqrt{(dh/dx)^2 + (dh/dy)^2}$$

is a slope magnitude of the outer surface at the given position x,y,
wherein a 75% quantile of values that have been determined for the term $$\sqrt{(dh/dx)^2 + (dh/dy)^2} \times d1/h(x,y)_{delta}$$

for all given positions x,y within a circular area having a radius of $0.4 \times d2/2$ and a center that corresponds to the center of the glass circular bottom is less than 4100 µm/mm,
wherein adjacent positions x,y increase stepwise by 200 µm, and
wherein $h(x,y)_{delta}=h(x,y)_{max}-h(x,y)_{min}$, $h(x,y)_{max}$ is a maximum value for h(x,y) and $h(x,y)_{min}$ is a minimum value for h(x,y) being determined in that circular area.

15. The glass container of claim 14, wherein the 75% quantile of the values that have been determined for the term $$\sqrt{(dh/dx)^2+(dh/dy)^2} \times d1/h(x,y)_{delta}$$

for all given positions x,y within a circular area having a radius of $0.6 \times d2/2$ and that corresponds to the center of the glass circular bottom is less than 4100 μm/mm.

16. The glass container of claim 14, wherein the 75% quantile of the values that have been determined for the term $$\sqrt{(dh/dx)^2+(dh/dy)^2} \times d1/h(x,y)_{delta}$$

for all given positions x,y within a circular area having a radius of $0.8 \times d2/2$ and that corresponds to the center of the glass circular bottom is less than 4100 μm/mm.

17. The glass container of claim 1, wherein for any cut surface of the circular glass bottom that is obtainable by cutting the circular glass bottom in a plane that includes the longitudinal axis ($L_{tube}$) a condition is fulfilled that comprises:

$$s2_{max}/s1 \times (s2_{max}/s2_{min}-1) \leq 1.1$$

wherein $s2_{max}$ corresponds to a maximum glass thickness of the circular glass bottom, wherein $s2_{min}$ corresponds to a minimum glass thickness of the circular glass bottom, wherein $s2_{max}$ and $s2_{min}$ are determined within a given cut surface within the range from $x=-0.4 \times d2/2$ to $x=+0.4 \times d2/2$, and wherein $s2_{min}$ and $s2_{max}$ are both measured in a direction that is parallel to the longitudinal axis ($L_{tube}$).

18. The glass container of claim 17, wherein $s2_{max}$ and $s2_{min}$ are determined within a given cut surface at least within the range from $x=-0.6 \times d2/2$ to $x=+0.6 \times d2/2$.

19. The glass container of claim 17, wherein $s2_{max}$ and $s2_{min}$ are determined within a given cut surface at least within the range from $x=0.8 \times d2/2$ to $x=+0.8 \times d2/2$.

20. The glass container of claim 1, wherein the glass container comprises a pharmaceutical composition.

* * * * *